United States Patent
Maheshwari et al.

(10) Patent No.: US 10,504,026 B2
(45) Date of Patent: Dec. 10, 2019

(54) STATISTICAL DETECTION OF SITE SPEED PERFORMANCE ANOMALIES

(71) Applicant: LinkedIn Corporation, Mountain View, CA (US)

(72) Inventors: Ritesh Maheshwari, Mountain View, CA (US); Liang Zhang, Fremont, CA (US); Yang Yang, Fremont, CA (US); Jieying Chen, Sunnyvale, CA (US); Ruixuan Hou, Sunnyvale, CA (US); Steven S. Noble, Soquel, CA (US); David Q. He, Cupertino, CA (US); Sanjay S. Dubey, Fremont, CA (US); Deepak Agarwal, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1043 days.

(21) Appl. No.: 14/956,095

(22) Filed: Dec. 1, 2015

(65) Prior Publication Data

US 2017/0154275 A1 Jun. 1, 2017

(51) Int. Cl.
*G06N 5/04* (2006.01)

(52) U.S. Cl.
CPC .................. *G06N 5/045* (2013.01)

(58) Field of Classification Search
CPC ....... H04L 41/064; H04L 43/16; H04L 43/08; G06F 11/3466; G06F 11/3452; G06F 2201/81; G06F 11/3079
See application file for complete search history.

(56) References Cited

U.S. PATENT DOCUMENTS

| | | |
|---|---|---|
| 7,310,590 B1 | 12/2007 | Bansal |
| 7,502,844 B2 * | 3/2009 | Garg .................. H04L 43/0811 370/245 |
| 7,808,916 B1 * | 10/2010 | Futamura ........... H04L 63/1416 370/241 |
| 8,060,259 B2 | 11/2011 | Budhraja et al. |
| 8,688,620 B2 | 4/2014 | Viswanathan et al. |
| 8,924,333 B2 | 12/2014 | Biem |
| 9,021,451 B2 | 4/2015 | Park et al. |
| 9,268,499 B1 | 2/2016 | Wilkins et al. |
| 9,450,849 B1 | 9/2016 | Goldberg et al. |
| 9,471,544 B1 * | 10/2016 | Yu ........................ G06K 9/0053 |

(Continued)

OTHER PUBLICATIONS

Feng, "Efficent end to end monitoring for fault management in distributed systems", Machine learning, Jul. 2014, pp. 1-179 (Year: 2014).*

(Continued)

*Primary Examiner* — Paulinho E Smith
(74) *Attorney, Agent, or Firm* — Park, Vaughan, Fleming & Dowler LLP; Chia-Shin Suen

(57) ABSTRACT

A system for processing data is provided. During operation, the system obtains a current window of one or more intervals of timeseries data collected from a monitored system. Next, the system continuously performs a statistical hypothesis test that compares the one or more intervals of the time-series data with baseline values from historic time-series data associated with the monitored system. When the statistical hypothesis test indicates a deviation of the time-series data from the baseline values, the system outputs an alert of an anomaly represented by the deviation.

20 Claims, 15 Drawing Sheets

(56) References Cited

U.S. PATENT DOCUMENTS

| | | |
|---|---|---|
| 9,509,710 B1 | 11/2016 | Barry et al. |
| 9,524,226 B2 | 12/2016 | Calcagno et al. |
| 9,575,828 B2* | 2/2017 | Agarwal ............... G06F 11/079 |
| 9,614,742 B1 | 4/2017 | Zhang et al. |
| 9,652,254 B2 | 5/2017 | Jing |
| 9,848,007 B2 | 12/2017 | Chen et al. |
| 9,961,571 B2 | 5/2018 | Yang et al. |
| 10,102,056 B1* | 10/2018 | Goldberg ............... G06F 11/079 |
| 2005/0278703 A1* | 12/2005 | Lo ....................... G06F 11/0709 |
| | | 717/126 |
| 2006/0020866 A1* | 1/2006 | Lo ....................... G06F 11/0709 |
| | | 714/741 |
| 2006/0218543 A1 | 9/2006 | Boger |
| 2007/0150949 A1* | 6/2007 | Futamura ............ H04L 63/1416 |
| | | 726/22 |
| 2009/0024994 A1 | 1/2009 | Kannan et al. |
| 2009/0106614 A1 | 4/2009 | Desineni et al. |
| 2009/0234899 A1 | 9/2009 | Kramer |
| 2010/0050023 A1 | 2/2010 | Scarpelli et al. |
| 2010/0332906 A1 | 12/2010 | Agrawal et al. |
| 2011/0119374 A1 | 5/2011 | Ruhl et al. |
| 2012/0116850 A1 | 5/2012 | Abe et al. |
| 2012/0185735 A1 | 7/2012 | Sambamurthy et al. |
| 2013/0030761 A1 | 1/2013 | Lakshminarayan et al. |
| 2013/0227103 A1 | 8/2013 | Garimella et al. |
| 2013/0275812 A1 | 10/2013 | Bernstein et al. |
| 2014/0108640 A1 | 4/2014 | Mathis |
| 2014/0122691 A1 | 5/2014 | Simhon et al. |
| 2014/0279779 A1* | 9/2014 | Zou ......................... G06N 3/08 |
| | | 706/25 |
| 2015/0032752 A1* | 1/2015 | Greifeneder .......... H04L 41/142 |
| | | 707/738 |
| 2015/0039749 A1* | 2/2015 | Kwan ................. H04L 41/5067 |
| | | 709/224 |
| 2015/0074035 A1 | 3/2015 | Narasappa |
| 2015/0135312 A1 | 5/2015 | Wada et al. |
| 2015/0207696 A1* | 7/2015 | Zhang ................. H04L 41/5009 |
| | | 709/224 |
| 2015/0288557 A1 | 10/2015 | Gates et al. |
| 2016/0036718 A1 | 2/2016 | Shingari et al. |
| 2016/0062950 A1 | 3/2016 | Brodersen et al. |
| 2016/0065419 A1 | 3/2016 | Szilagyi et al. |
| 2016/0065604 A1 | 3/2016 | Chen et al. |
| 2016/0173690 A1 | 6/2016 | Perez et al. |
| 2016/0179588 A1 | 6/2016 | Raman et al. |
| 2016/0224400 A1 | 8/2016 | Shafique et al. |
| 2016/0277360 A1* | 9/2016 | Dwyier ............... H04L 63/0227 |
| 2016/0323157 A1 | 11/2016 | Marvasti et al. |
| 2016/0378615 A1* | 12/2016 | Cohen .................... G06F 11/00 |
| | | 714/19 |
| 2017/0048119 A1 | 2/2017 | Quin et al. |
| 2017/0068581 A1 | 3/2017 | Qi et al. |
| 2017/0116059 A1* | 4/2017 | Wolf ..................... G06F 11/079 |
| 2017/0149634 A1 | 5/2017 | Bezold et al. |
| 2017/0154071 A1 | 6/2017 | Chen et al. |
| 2017/0155537 A1* | 6/2017 | Maheshwari ......... H04L 41/064 |
| 2017/0155570 A1* | 6/2017 | Maheshwari ........... H04L 43/50 |

OTHER PUBLICATIONS

"Non Final Office Action Issued in U.S. Appl. No. 14/956,131", dated Feb. 14, 2018, 59 Pages.

"Notice of Allowance Issued in U.S. Appl. No. 14/956,131", dated Aug. 28, 2018, 19 Pages.

"Non Final Office Action Issued in U.S. Appl. No. 14/956,137", dated Aug. 23, 2018, 11 Pages.

* cited by examiner

STATISTICAL DETECTION OF SITE SPEED PERFORMANCE ANOMALIES

RELATED APPLICATIONS

The subject matter of this application is related to the subject matter in a non-provisional application by inventors Ritesh Maheshwari, Liang Zhang, Yang Yang, Jieying Chen, Toon Sripatanaskul, Ruixuan Hou, Steve Noble, David He, Sanjay Dubey and Deepak Agarwal, entitled "Root Cause Investigation of Site Speed Performance Anomalies," having Ser. No. 14/956,137, and filing date Dec. 1, 2015, now Issued U.S. Pat. No. 10,263,833.

The subject matter of this application is also related to the subject matter in a non-provisional application by inventors Ritesh Maheshwari, Liang Zhang, Yang Yang, Jieying Chen, Toon Sripatanaskul, Ruixuan Hou, Steve Noble, David He, Sanjay Dubey and Deepak Agarwal, entitled "Analysis of Site Speed Performance Anomalies Caused by Server-Side Issues," having Ser. No. 14/956,131, and filing date Dec. 1, 2015, now Issued U.S. Pat. No. 10,171,335.

BACKGROUND

Field

The disclosed embodiments relate to anomaly detection. More specifically, the disclosed embodiments relate to techniques for performing statistical detection of site speed performance anomalies.

Related Art

Web performance is important to the operation and success of many organizations. In particular, a company with an international presence may provide websites, web applications, mobile applications, databases, content, and/or other services or resources through multiple data centers around the globe. An anomaly or failure in a server or data center may disrupt access to the service or resources, potentially resulting in lost business for the company and/or a reduction in consumer confidence that results in a loss of future business. For example, high latency in loading web pages from the company's website may negatively impact the user experience with the website and deter some users from returning to the website.

The distributed nature of web-based resources may complicate the accurate detection and analysis of web performance anomalies and failures. For example, a performance of a website may be monitored by setting a threshold for a performance metric such as page load time and generating an alert of an anomaly when the performance metric exceeds the threshold. Because the website may be accessed through multiple data centers with different amounts of computational and/or network bandwidth, the threshold may be manually selected to accommodate the site speeds supported by each data center location.

At the same time, a custom threshold for each data center may be unable to account for fluctuations in network traffic. For example, the page load time in a data center may increase during periods of high network traffic and decrease during periods of low network traffic. However, a threshold that does not account for peaks and troughs in network traffic may generate many false alarms during the peaks and detect only large anomalies during the troughs.

Consequently, detection and analysis of anomalies in web performance may be improved by dynamically adapting the monitoring of performance metrics to conditions that affect the performance metrics.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
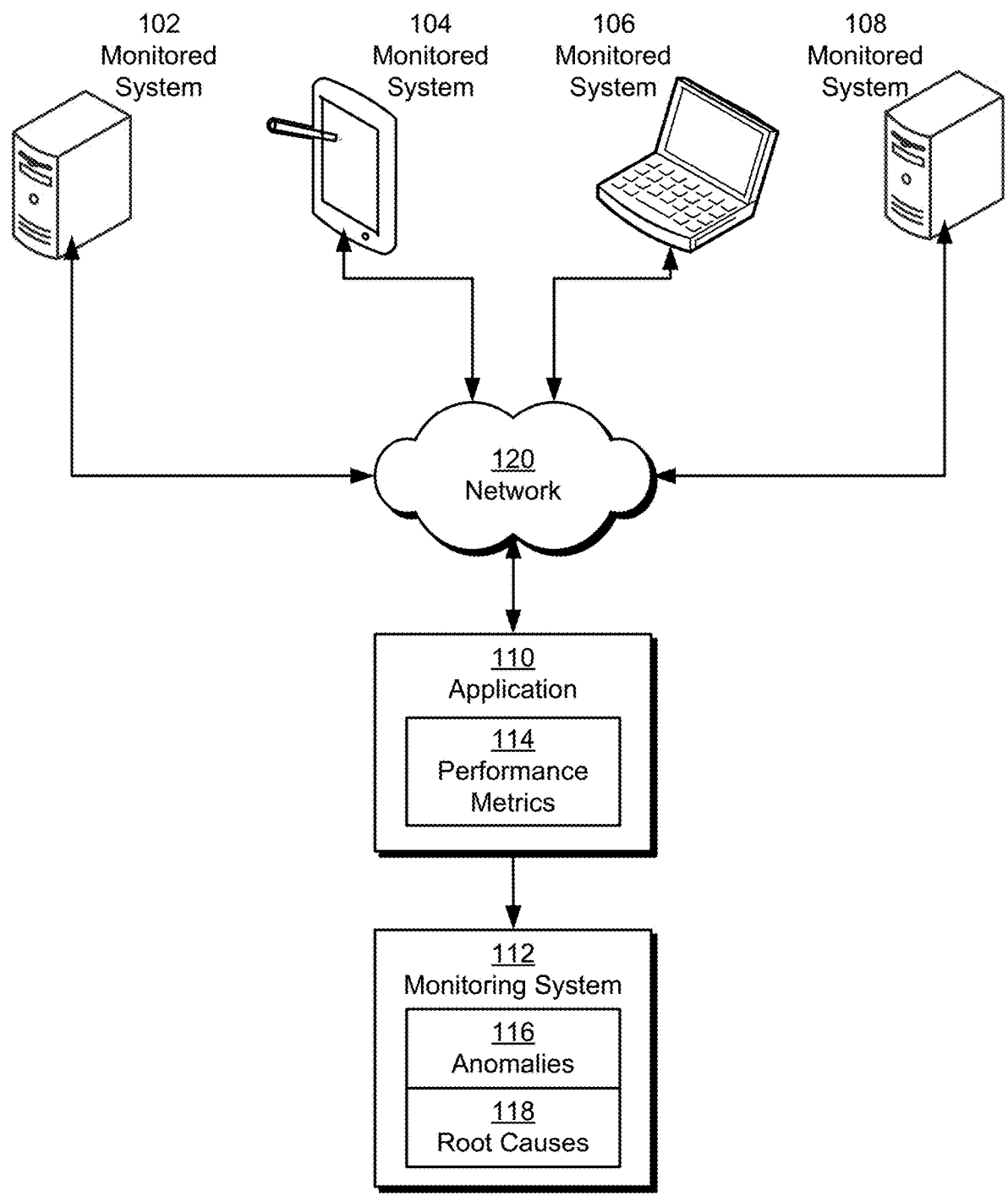
FIG. 1 shows a schematic of a system in accordance with the disclosed embodiments.

The disclosed embodiments provide a method, apparatus, and system for processing data. More specifically, the disclosed embodiments provide a method, apparatus, and system for analyzing time-series data collected from a monitored system. As shown in FIG. 1, a monitoring system 112 may monitor one or more performance metrics 114 related to access to an application 110 by a number of monitored systems 102-108. For example, application 110 may be a web application, one or more components of a mobile application, and/or another type of client-server application that is accessed over a network 120. In turn, monitored systems 102-108 may be personal computers (PCs), laptop computers, tablet computers, mobile phones, portable media players, workstations, gaming consoles, and/or other network-enabled computing devices that are capable of executing application 110 in one or more forms.

During access to application 110, monitored systems 102-108 may provide performance metrics 114 to application 110 and/or monitoring system 112 for subsequent analysis by monitoring system 112. For example, a computing device that retrieves one or more pages (e.g., web pages) or screens of application 110 over network 120 may transmit load times of the pages or screens to application 110.

In addition, one or more monitored systems 102-108 may be monitored indirectly through performance metrics 114 reported by other monitored systems. For example, the performance of a server and/or data center may be monitored by collecting page load times, latencies, and/or other performance metrics 114 from client computer systems that request pages, data, and/or application components from the server and/or data center.

Performance metrics 114 from monitored systems 102-108 may be aggregated by application 110 and/or other monitored systems, such as the data server from which application 110 is served. Performance metrics 114 may then be provided to monitoring system 112 for the detection of anomalies 116 in the load times and/or the analysis of root causes 118 of anomalies 116, as described in further detail below.

Figure 2:
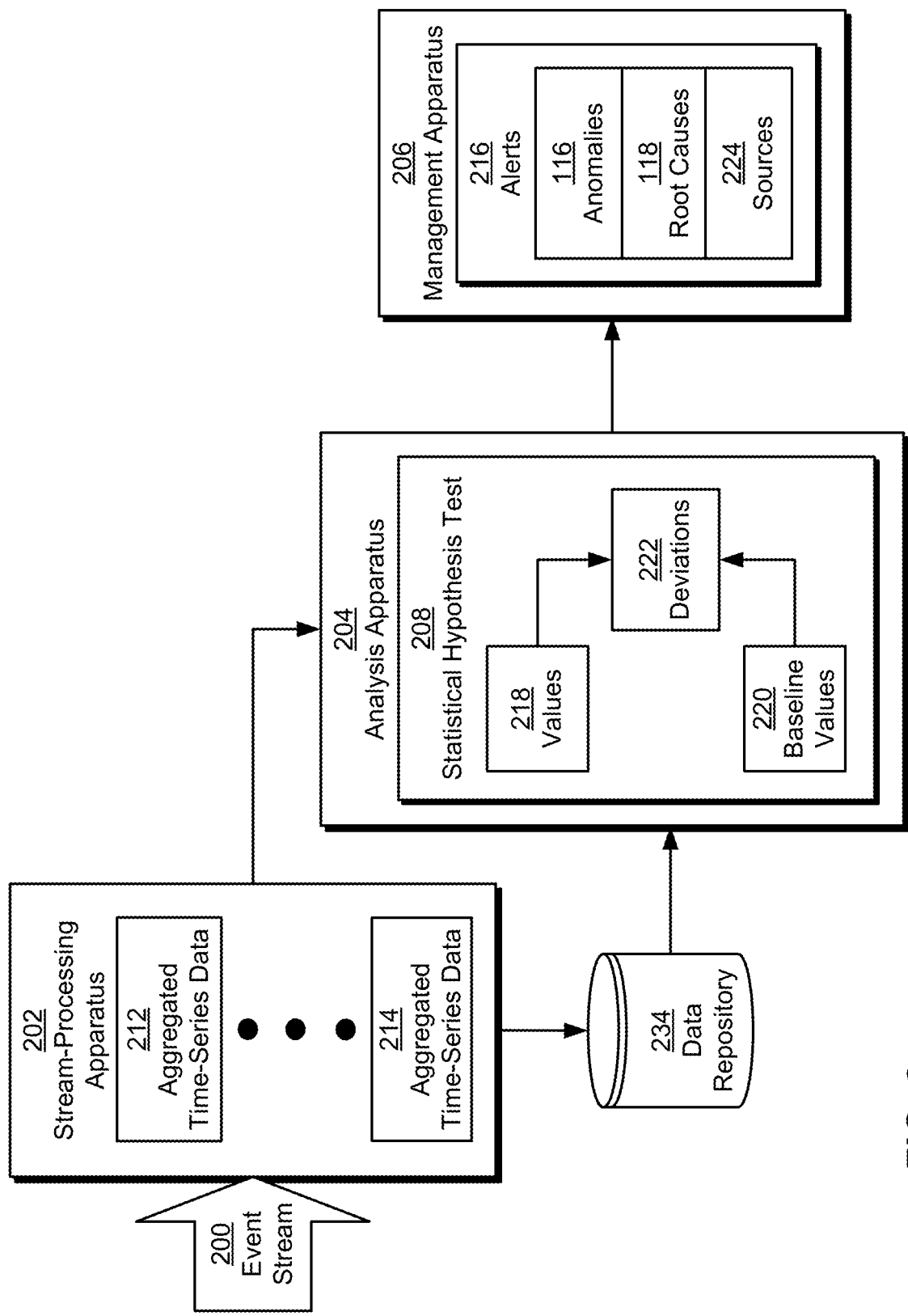
FIG. 2 shows a system for analyzing time-series data from a monitored system in accordance with the disclosed embodiments.

FIG. 2 shows a system for analyzing time-series data from a monitored system in accordance with the disclosed embodiments. More specifically, FIG. 2 shows a monitoring system that collects and analyzes time-series data from a number of monitored systems, such as monitoring system 112 of FIG. 1. As shown in FIG. 2, the monitoring system includes a stream-processing apparatus 202, an analysis apparatus 204, and a management apparatus 206. Each of these components is described in further detail below.

Stream-processing apparatus 202 may generate aggregated time-series data 212-214 from an event stream 200 containing records of page views, clicks, and/or other activity collected from the monitored systems; performance metrics associated with the activity, such as page load times; and/or other time-series data from the monitored systems. As a result, stream-processing apparatus 202 may receive large numbers (e.g., thousands) of event records from event stream 200 every second. In addition, events in event stream 200 may be obtained from multiple sources. For example, records of events associated with use of a website or web application may be received from a number of servers and/or data centers hosting the website, which in turn may receive data used to populate the records from computer systems, mobile devices, and/or other electronic devices that interact with the website or web application. The records may then be aggregated to event stream 200 for further processing by stream-processing apparatus 202.

To generate aggregated time-series data 212-214 from events in event stream 200, stream-processing apparatus 202 may aggregate records of the events along one or more dimensions. For example, stream-processing apparatus 202 may aggregate page views, clicks, page-load times, and/or other metrics by location or region (e.g., United States) and page keys of the corresponding web pages. Such aggregated metrics may include, but are not limited to, a median, a quantile (e.g., $90^{th}$ percentile), a variance, a mean, a maximum, a minimum, a count (e.g., number of page views), and/or other summary statistics.

In addition, stream-processing apparatus 202 may aggregate events from event stream 200 in a number of ways. For example, stream-processing apparatus 202 may aggregate sets of a pre-defined consecutive number (e.g., 1000) of page views, page load times, and/or other metrics for a given location and page key into a single aggregated record. Alternatively, stream-processing apparatus 202 may aggregate records received from event stream 200 along pre-specified intervals (e.g., five-minute intervals) independently of the number of events generated within each interval.

After aggregated time-series data 212-214 is produced, stream-processing apparatus 202 may store the aggregated time-series data in a data repository 234 such as a relational database, distributed filesystem, and/or other storage mechanism for subsequent retrieval and use. A portion of aggregated time-series data 212-214 may be transmitted directly to analysis apparatus 204 and/or another component of the system for real-time or near-real-time analysis by the component.

In one or more embodiments, metrics and dimensions in event stream 200 are associated with user activity at an online professional network. The online professional network may allow users to establish and maintain professional connections, list work and community experience, endorse and/or recommend one another, search and apply for jobs, and/or engage in other activity. Employers may list jobs, search for potential candidates, and/or provide business-related updates to users. As a result, the metrics may track values such as dollar amounts spent, impressions of ads or job postings, clicks on ads or job postings, profile views, messages, job or ad conversions within the online professional network, and so on. In turn, the dimensions may describe attributes of the users and/or events from which the metrics are obtained. For example, the dimensions may include the users' industries, titles, seniority levels, employers, skills, and/or locations. The dimensions may also include identifiers for the ads, jobs, profiles, pages, and/or employers associated with content viewed and/or transmitted in the events. The metrics and dimensions may thus facilitate understanding and use of the online professional network by advertisers, employers, and/or other members of the online professional network.

Moreover, metrics related to the performance of a website, web application, mobile application, and/or other network-based application used to access the online professional network may be used by developers, administrators, and/or other users associated with creating and maintaining the application to identify issues and/or anomalies with the performance. For example, page load times, latencies, and/or other time-series performance metrics in event stream 200 and/or aggregated time-series data 212-214 may be analyzed to detect deviations 222 of values 218 of the performance metrics from normal or baseline values 220 of the performance metrics. In turn, deviations 222 may be used to generate alerts 216 that can be used to remedy anomalies 118 represented by deviation 222 before anomalies 116 negatively impact the user experience with the online professional network.

In particular, analysis apparatus 204 may use a statistical hypothesis test 208 to compare values 218 of recently aggregated and/or collected time-series data (e.g., aggregated time-series data 212-214) with baseline values 220 of historic time-series data for the same application, location, page, and/or other dimension. Statistical hypothesis test 208 may detect statistically significant deviations 222 in values 218 from baseline values 220. For example, statistical hypothesis test 208 may include a sign test that identifies a deviation in values 218 of aggregated page load times over five-minute intervals in a recent two-hour window with baseline values 220 of aggregated page load times from one or more previous two-hour windows. After a deviation is found in the time-series data, analysis apparatus 204 may repeat statistical hypothesis test 208 with transformed baseline values 220 to determine a severity of the deviation. Because deviations 222 are identified using statistical techniques and baseline values that are generated from historic data, analysis apparatus 204 may detect anomalies 116 in the time-series data with higher accuracy than anomaly-detection techniques that utilize fixed thresholds. Statistical detection of deviations in time-series data is described in further detail below with respect to FIG. 4.

Analysis apparatus 204 may also use statistical hypothesis test 208 to investigate one or more root causes 118 of anomalies 116 in the time-series data. More specifically, after a deviation in a time-series performance metric is found, analysis apparatus 204 may obtain a set of components of the time-series performance metric from stream-processing apparatus 202, data repository 234, and/or another source of time-series data, and perform statistical hypothesis test 208 on each component to identify the presence or absence of a deviation in the component from baseline values 220 of the component.

For example, analysis apparatus 204 may obtain a set of components of a page load time that includes a connection time, a first byte time, a content download time, and a client rendering time. To identify network issues as a source of a deviation in the page load time, analysis apparatus 204 may perform statistical hypothesis test 208 on the connection time. If statistical hypothesis test 208 detects a deviation in the connection time from the corresponding baseline values 220, analysis apparatus 204 may include network issues (e.g., from networks used to access the website) in root causes 118 of an anomaly represented by the deviation. To identify server-side issues (e.g., in servers from which the website is served) as a source of a deviation in the page load time, analysis apparatus 204 may perform statistical hypothesis test 208 on the first byte time and/or content download time. If statistical hypothesis test 208 detects a deviation in the first byte time and/or content download time from baseline values 220, analysis apparatus 204 may include server-side issues in root causes 118 of the anomaly. To identify client issues (e.g., in client computing devices used to render the website) as a source of the deviation in the page load time, analysis apparatus 204 may perform statistical hypothesis test 208 on the client rendering time. If statistical hypothesis test 208 detects a deviation in the client rendering time, analysis apparatus 204 may include client issues in root causes 118 of the anomaly. Investigating root causes of performance anomalies is described in further detail below with respect to FIG. 5.

After a root cause of an anomaly is identified, analysis apparatus 204 may analyze additional data associated with the anomaly to identify a source of the anomaly. Continuing with the above example, analysis apparatus 204 may identify a source of a network issue by aggregating the connection time by dimension values of one or more dimensions associated with the page load time, and use statistical hypothesis test 208 to compare the aggregated connection time with a baseline connection time associated with the same dimension values. When statistical hypothesis test 208 identifies a deviation in the aggregated connection time from the baseline connection time, analysis apparatus 204 may associate the corresponding dimension value with the source of the anomaly. Analyzing anomalies in time-series performance data that are caused by network issues is described in further detail below with respect to FIG. 6.

Similarly, analysis apparatus 204 may use a call graph representation of a first byte time, content download time, and/or another component of the page load time to identify a source of a server-side issue. The call graph representation may include a parent value of the component for a parent node in a call graph and a set of child values of the component for a set of child nodes of the parent node in the call graph. The parent value may represent the overall value of the component during an event such as a page load, and the child values may represent the individual processing times at each child node (e.g., service, application-programming interface (API), etc.) during the page load. To identify one or more child nodes as sources 224 of the anomaly in the page load time, correlations and/or dependences between the child values and the parent value may be determined, and child nodes with child values that are highly correlated with the parent value may be included as sources of the server-side issue. Analyzing performance anomalies caused by server-side issues is described in further detail below with respect to FIG. 7A-7B.

After anomalies 116, root causes 118 of the anomalies, and/or sources 224 of the root causes are identified by analysis apparatus 204, management apparatus 206 may generate one or more alerts 216 of anomalies 116, root causes 118, and/or sources 224. For example, management apparatus 206 may generate an email alert and/or notification of an anomaly in a page loading time whenever a deviation represented by the anomaly is detected by analysis apparatus 204. The alert may be transmitted to a page owner of a web page associated with the page loading time and/or an infrastructure owner associated with a location of the anomaly, such as an administrator of a data center from which the web page is served. If one or more root causes 118 of the anomaly and/or sources 224 of the root causes are found, the root causes and/or sources may be specified in the alert to facilitate management and/or resolution of the anomalies by the page owner and/or infrastructure owner.

Management apparatus 206 may also group anomalies 116 with similar root causes 118, sources 224, dimensions, and/or other attributes under the same alerts 216. For example, management apparatus 206 may produce alerts 216 for different combinations of pages, countries, anomaly types, and/or root causes. Each anomaly detected by analysis apparatus 204 may be assigned to one or more alerts based on the root causes 118, sources 224, page, country, and/or other attributes associated with the anomaly. As a result, the anomaly may potentially be included in multiple alerts, and groups of anomalies 116 under alerts 216 may overlap.

Such grouping of anomalies 116 under alerts 216 may allow management apparatus 206 to target multiple entities with alerts 216. For example, one or more anomalies 116 may include both network issues and server-side issues as root causes 118. In turn, management apparatus 206 may group anomalies 116 under a first alert for network issues and a second alert for server-side issues, transmit the first alert to a network administrator and/or other entity that resolves network issues, and transmit the second alert to page owners of web pages associated with the server-side issues and/or another entity that resolves such issues. Consequently, management apparatus 206 may increase the relevance of the alerts to the entities and improve resolution of the anomalies by the entities.

Those skilled in the art will appreciate that the system of FIG. 2 may be implemented in a variety of ways. First, data repository 234, stream-processing apparatus 202, analysis apparatus 204, and management apparatus 206 may be provided by a single physical machine, multiple computer systems, one or more virtual machines, a grid, one or more databases, one or more filesystems, and/or a cloud computing system. Stream-processing apparatus 202, analysis apparatus 204, and management apparatus 206 may additionally be implemented together and/or separately by one or more hardware and/or software components and/or layers.

Second, a number of metrics, statistical techniques, and/or hypothesis tests may be used to identify deviations 222 in values 218 of time-series data from baseline values 220. For example, analysis apparatus 204 may use a student's t-test to identify deviations 222 in the variance of aggregated time-series data 212-214 from baseline values 220 of the variance. In another example, analysis apparatus 204 may use a z-statistic calculated from values 218 and baseline values 220 of aggregated time-series data 212-214 to detect deviations 222 in the distribution of values 218 from the distribution of baseline values 220. In a third example, other statistical techniques, such as support vector machines, neural networks, and/or clustering techniques, may be used to identify anomalies 116 and/or root causes 118 in performance metrics, sensor data, usage statistics, and/or other time-series data collected from the monitored systems.

Figure 3:
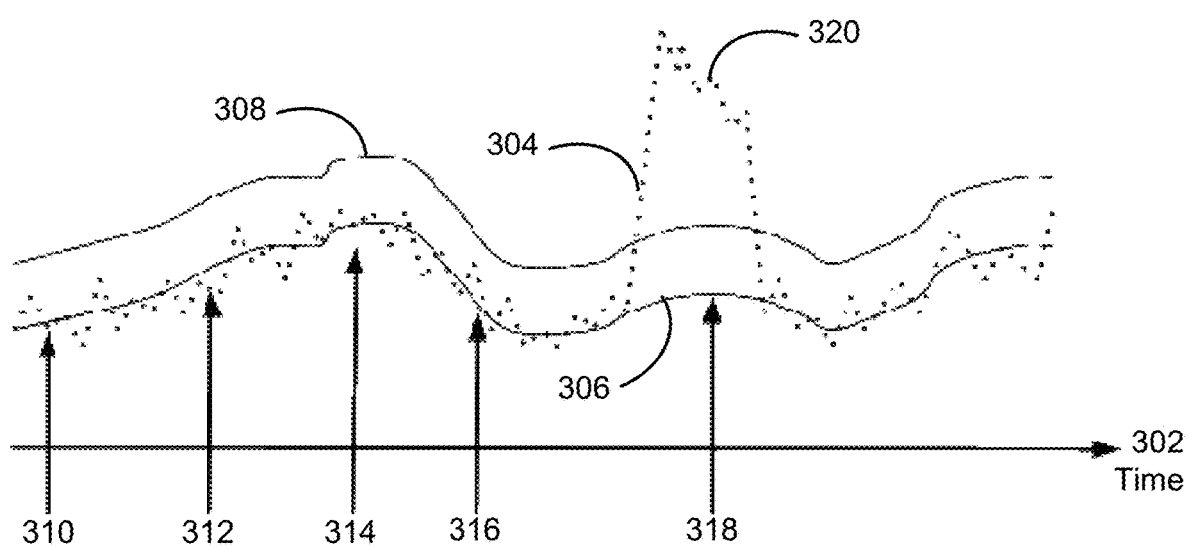
FIG. 3 shows an exemplary plot in accordance with the disclosed embodiments.

FIG. 3 shows an exemplary plot in accordance with the disclosed embodiments. More specifically, FIG. 3 shows a plot of a set of metrics 304-308 over time 302. Metric 304 may represent time-series data that is analyzed for an anomaly, such as aggregated time-series data 212-214 of FIG. 2. Values of metric 304 may be obtained and/or aggregated over pre-specified intervals. For example, page load times, connection times, first byte times, content download times, client render times, and/or other metrics associated with site speed performance may be aggregated into a median, quantile, variance, count, and/or summary statistic for each five-minute interval within which the metrics are collected.

Metric 304 may be compared to one or more other metrics 306-308 to identify an anomaly 320 in metric 304. Metric 306 may represent baseline values of the time-series data, and metric 308 may represent a threshold that indicates a deviation in metric 304 from metric 306. For example, metric 306 may be calculated from one or more previous intervals, such as five-minute intervals from previous days, weeks, and/or other seasonal periods of the time-series data. Metric 308 may then be set as a fixed and/or scaled amount above metric 306.

To identify anomaly 320, a series of estimates 310-318 of metric 306 may be calculated and compared with values of metric 304. Estimates 310-318 may represent predictions of metric 304 based on aggregated historic values of metric 304, as represented by metric 306. Because estimates 310-318 are calculated from historic time-series data, estimates 310-318 may track seasonality and/or trends in the time-series data.

Estimates 310-318 may then be compared with values of metric 304 to identify anomaly 320. For example, comparison of estimates 310-316 with corresponding values of metric 304 may indicate that metric 304 does not deviate from estimates 310-316, since metric 304 falls below the threshold represented by metric 308. However, comparison of estimate 318 with the corresponding value of metric 304 may identify an increase in metric 304 from estimate 318 by an amount that exceeds the threshold.

Moreover, the increase over the threshold may be sustained for long enough that the increase is statistically significant, thereby indicating a presence of anomaly 320. For example, anomaly 320 may be detected by a statistical hypothesis test that compares values of metric 304 that have been aggregated over five-minute intervals within a two-hour window with baseline values represented by metric 306. Because the statistical hypothesis test identifies a deviation in metric 304 only when the increase over the baseline values and/or threshold 308 is statistically significant, anomaly 320 may not be identified until the increase has been sustained for a number of intervals within the two-hour window. Such detection of anomaly 320 as a sustained deviation in values of metric 304 from the baseline values may reduce the volume of overall and false alerts over anomaly-detection techniques that use fixed thresholds and/or detect anomalies represented by transient spikes in the time-series data.

Figure 4:
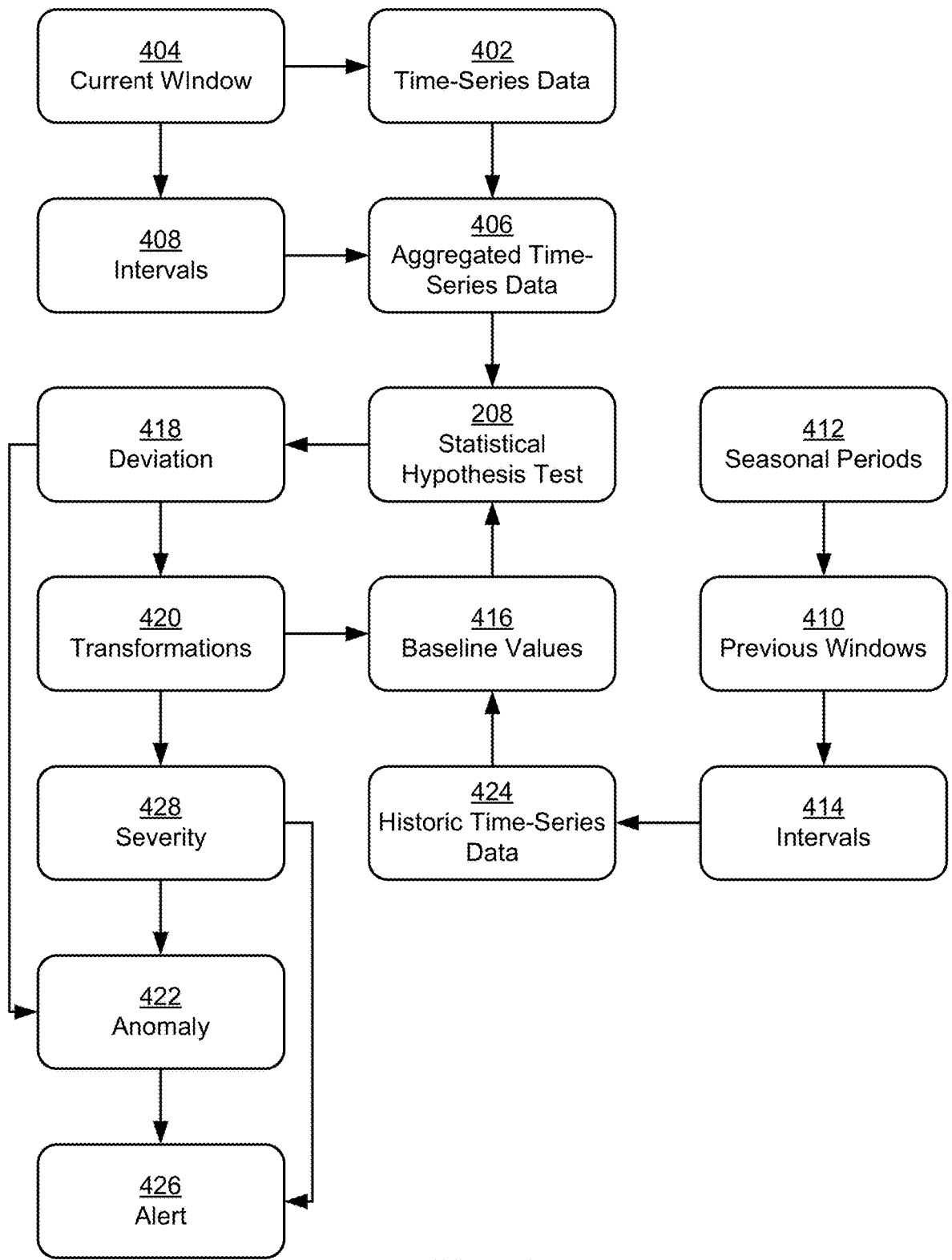
FIG. 4 shows the detection of an anomaly in time-series data collected from a monitored system in accordance with the disclosed embodiments.

FIG. 4 shows the detection of an anomaly 422 in time-series data 402 collected from a monitored system in accordance with the disclosed embodiments. For example, anomaly 422 may be detected in a times-series performance metric such as a page load time that is collected from and/or associated with a server, data center, computer system, and/or other monitored system. Anomaly 422 may alternatively or additionally be detected in other types of time-series data 402, including, but not limited to, sensor data, usage data, financial data, and/or scientific data.

First, a current window 404 of time-series data 402 may be obtained, and one or more intervals 408 of aggregated time-series data 406 within current window 404 may be generated. Current window 404 may represent a sliding window that tracks the current time, such as the most recent two hours of time-series data 402.

Intervals 408 may represent subsets of current window 404 into which time-series data 402 is aggregated. For example, aggregated time-series data 406 may be generated from time-series data 402 in current window 404 by aggregating time-series data 402 into five-minute intervals 408 (or "buckets") that span a two-hour current window 404. During production of aggregated time-series data 406, values of time-series data 402 in a given interval may be aggregated into a mean, median, quantile, variance, count, and/or other summary statistic of the values. Thus, aggregated time-series data 406 may include 24 different sets of summary statistics, one for each five-minute interval in the two-hour window.

A set of baseline values 416 may also be generated from historic time-series data 424 associated with the monitored system Like aggregated time-series data 406, baseline values 416 may be generated from one or more intervals 414 spanning one or more previous windows 410 of historic time-series data 424. For example, baseline values 416 may be calculated from historic time-series data 424 collecting during multiple two-hour-long previous windows 410 in the last week, two weeks, month, and/or other period as summary statistics that span five-minute intervals 414 of the previous windows.

Summary statistics from corresponding intervals 414 within previous windows 410 may then be aggregated into a single set of baseline values 416 for each interval. For example, four median values of page load times from each five-minute interval in four previous windows 410 of historic time-series data 424 may be aggregated into a single baseline median value of the page load time for the interval using an average, a weighted average, and/or other formula.

In addition, previous windows 410 may be selected from one or more seasonal periods 412 associated with time-series data 402. Seasonal periods 412 may represent fixed periods over which patterns in time-series data 402 and historic time-series data 424 repeat. For example, each seasonal period may span a week to capture weekly seasonality in network traffic to a website, which may include higher traffic in the mornings, evenings, and weekdays, and lower traffic overnight and over the weekends. An increase in the network traffic may increase a page load time and/or performance metric in time-series data 402, while a decrease in the network traffic may decrease the performance metric.

To prevent the monitoring system from generating false positives from seasonal fluctuations in time-series data 402, baseline values 416 may be generated from previous windows 410 in previous seasonal periods 412 that correspond to current window 404 in the current seasonal period. For example, baseline values 416 for aggregated time-series data 406 from a current two-hour window of 6:00 pm to 8:00 pm on a Monday may be calculated using historic time-series data 424 from four previous windows 410 of 6:00 to 8:00 pm on the preceding four Mondays. In turn, the calculated baseline values 416 may track the weekly seasonality of time-series data 402, as affected by "normal" usage patterns and/or other factors that are separate from "abnormal" faults, issues, and/or failures that produce anomalies in time-series data 402.

Next, a statistical hypothesis test 208 may be used to compare aggregated time-series data 406 with baseline values 416 to assess a deviation 418 of aggregated time-series data 406 from baseline values 416. For example, statistical hypothesis test 208 may be a sign test that compares 24 values of aggregated time-series data 406 from 24 five-minute intervals 408 in a two-hour current window 404 with 24 baseline values 416 aggregated from previous windows 410 of historic time-series data 424. If the values of aggregated time-series data 406 are higher than baseline values 416 by a statistically significant amount, an anomaly 422 representing a deviation 418 of aggregated time-series data 406 from baseline values 416 may be found. Because statistical significance is required to establish deviation 418, statistical hypothesis test 208 may reduce the detection of noise and/or transient spikes in time-series data 402 as anomalies.

Once deviation 418 is established, one or more transformations 420 of baseline values 416 may be made to generate one or more severity levels associated with anomaly 422, and statistical hypothesis test 208 may be repeated with the transformed baseline values 416 to identify a severity 428 of anomaly 422. For example, baseline values 416 may be increased by 5-10% increments and/or fixed amounts, and statistical hypothesis test 208 may be repeated with the increased baseline values 416 to determine if deviation 418 of aggregated time-series data 406 is present. Severity 428 may thus represent the highest increase in baseline values 416 for which a statistically significant deviation 418 in aggregated time-series data 406 is still found.

Finally, an alert 426 of anomaly 422 may be outputted. For example, an email alert and/or notification of anomaly 426 may be transmitted to a page owner of a web page for which time-series data 402 is collected and/or an infrastructure owner of a data center from which the web page is served. To facilitate prioritization and/or resolution of anomaly 422 and/or other anomalies by recipients of alert 426, severity 428 may be included in alert 426. As a result, alert 426 may allow the recipients to prioritize the management and resolution of more severe anomalies over less severe anomalies.

Figure 5:
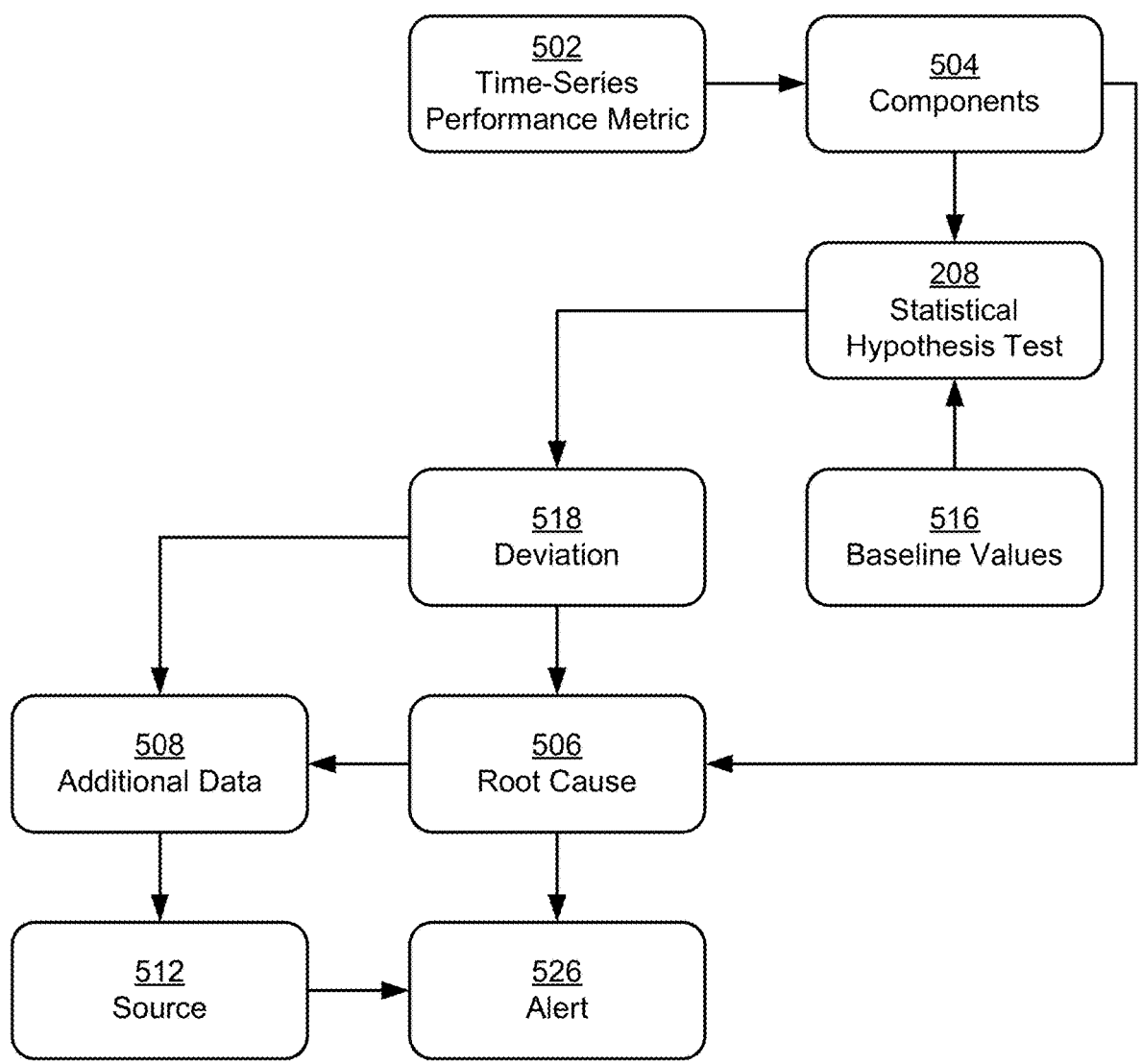
FIG. 5 shows the investigation of a root cause of an anomaly in a time-series performance metric in accordance with the disclosed embodiments.

FIG. 5 shows the investigation of a root cause 506 of an anomaly in a time-series performance metric 502 in accordance with the disclosed embodiments. As mentioned above, the anomaly may be represented by a deviation (e.g., deviation 418 of FIG. 4) of time-series performance metric 502 from baseline values of the performance metric. For example, the anomaly may be a statistically significant increase in the page load time of a web page over historic values of the page load time from one or more previous weeks and/or other seasonal periods of access to the web page.

Once the anomaly is established using statistical hypothesis test 208, root cause 506 of the anomaly may be investigated. First, a set of components 504 of time-series performance metric 502 may be obtained. For example, a page load time may be broken down into components 504 that include a connection time (e.g., the time required to establish a connection with a server providing a page), a first byte time (e.g., the time required to obtain the first byte of the page), a content download time (e.g., the time over which the page is downloaded), and a client render time (e.g., the time required to render the page on a client device). Components 504 may be tracked with time-series performance metric 502 by an application, service, and/or other mechanism that collects values of components 504 and time-series performance metric 502 from the client device.

Next, statistical hypothesis test 208 may be repeated with individual components 504 of time-series performance metric 502 to assess a deviation 518 of components 504 from baseline values 516 of components 504. As with aggregated time-series data 406 and baseline values 416 of FIG. 4, components 504 and baseline values 516 may be aggregated into intervals that fall within a current window and one or more previous windows, respectively. Similarly, statistical hypothesis test 208 may be a sign test and/or other statistical analysis technique that detects deviation 518 as a statistically significant difference between the values of components 504 in the intervals and the corresponding baseline values 516.

If deviation 518 is found by statistical hypothesis test 208, root cause 506 may be identified based on the component containing deviation 518. Continuing with the above example, a presence of deviation 518 in a client render time may indicate a client issue as root cause 506 of the anomaly. A presence of deviation 518 in a connection time may indicate a network issue as root cause 504. A presence of deviation 518 in a first byte time or content download time may indicate a server-side issue as root cause 504.

After root cause 506 is established, additional data 508 associated with deviation 518 and/or root cause 506 may be analyzed to identify a source 512 of the anomaly. Identifying sources of anomalies caused by network issues is described in further detail below with respect to FIG. 6, and identifying sources of anomalies caused by server-side issues is described in further detail below with respect to FIGS. 7A-7B.

Finally, an alert 526 that contains root cause 506, source 512, and/or other attributes of the anomaly may be outputted to enable management and/or resolution of the anomaly. As mentioned above, the anomaly may be matched to other anomalies with the same attributes, and the anomalies may be grouped into different alerts that represent the attributes. The alerts may then be transmitted to different sets of target recipients with the ability and/or resources to manage and resolve the corresponding anomalies.

Figure 6:
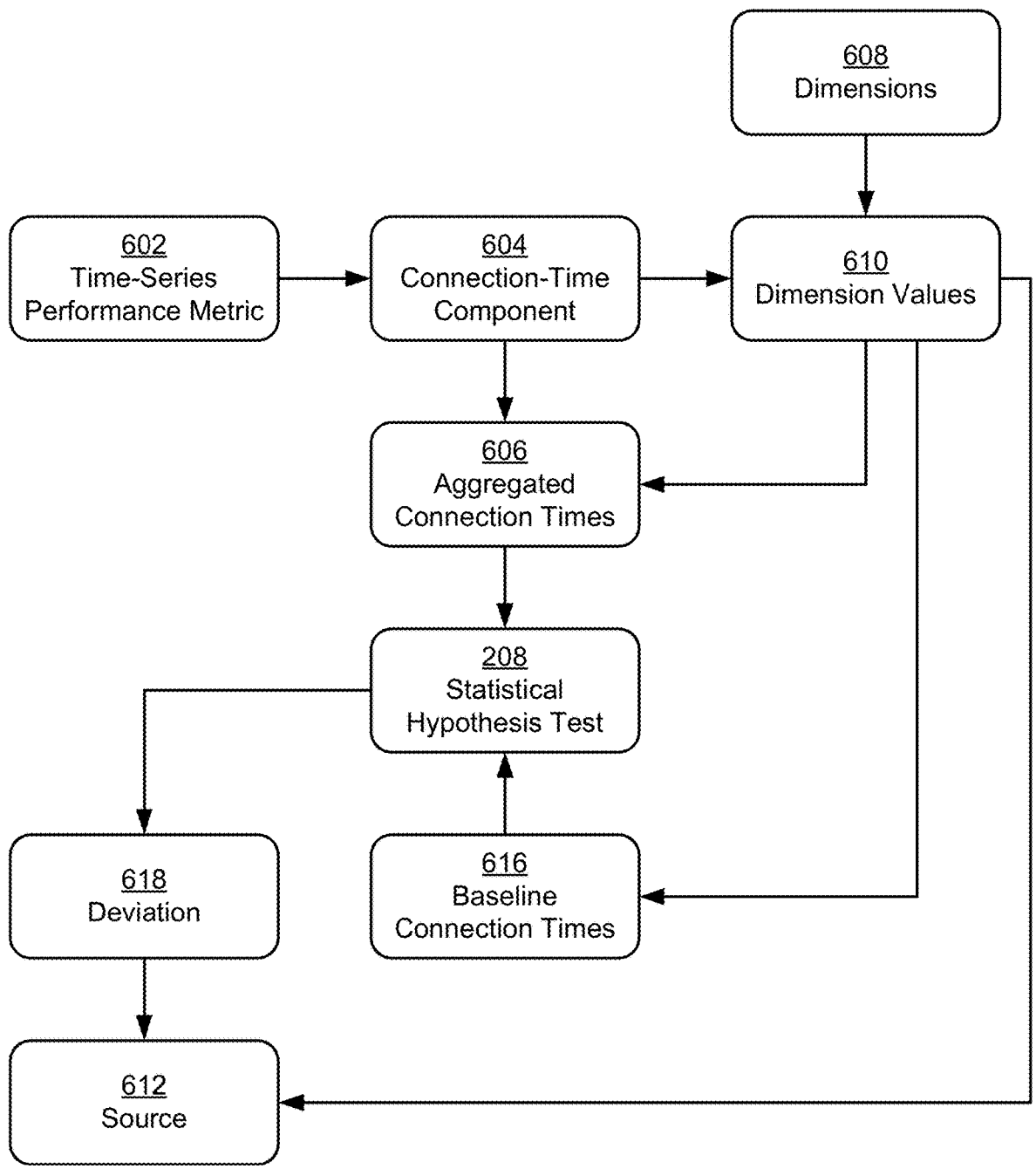
FIG. 6 shows the analysis of a network issue associated with an anomaly in a time-series performance metric in accordance with the disclosed embodiments.

FIG. 6 shows the analysis of a network issue associated with an anomaly in a time-series performance metric 602 in accordance with the disclosed embodiments. As mentioned above, the network issue may be identified as a root cause of an anomaly in time-series performance metric 602 when a statistically significant deviation (e.g., deviation 518 of FIG. 5) in a connection-time component 604 of time-series performance metric 602 is found.

During analysis of the network issue, connection-time component 604 may be aggregated by one or more dimension values 610 of one or more dimensions 608 associated with time-series performance metric 602. For example, dimensions 608 associated with connection-time component 604 may include a data center, point of presence (PoP), autonomous system number (ASN), page, and/or country. In turn, aggregated connection times 606 may be produced from values of connection-time component 604 for the same data center, PoP, ASN, page, and/or country.

Statistical hypothesis test 208 may then be used to compare aggregated connection times 606 with baseline connection times 616 for the same dimension values 610. For example, a sign test may be used to assess a deviation 618 of aggregated connection times 606 for a country from baseline connection times 616 for the country. As with other baseline values described above, baseline connection times 616 may be calculated from historic connection times in one or more seasonal periods, windows, and/or intervals that precede the current seasonal period, window, and/or intervals of aggregated connection times 606.

If deviation 618 is found in aggregated connection times 606, the dimension value used to generate aggregated connection times 606 is associated with a source 612 of the anomaly. Continuing with the above example, the country name of a country in which aggregated connection times 606 deviate from baseline connection times 616 in a statistically significant way may be included in metadata for source 612 and/or an alert containing source 612, such as alert 526 of FIG. 5.

The dimension value may also be used to obtain additional related dimension values 610, generate aggregated connection times 606 along the related dimension values, and assess deviation 618 of aggregated connection times 606 from baseline connection times 616 for the related dimension values. Continuing with the above example, the identification of a country as source 612 of the anomaly may trigger the generation of aggregated connection times 606 along dimension values 610 that represent data center names in the country. If deviation 618 is subsequently found in aggregated connection times 606 for a given data center, the data center is also included in source 612. Thus, repeated aggregation and analysis of connection-time component 604 along different dimensions 608 and dimension values 610 may enable identification of source 612 of the anomaly at different granularities.

Figure 7A:
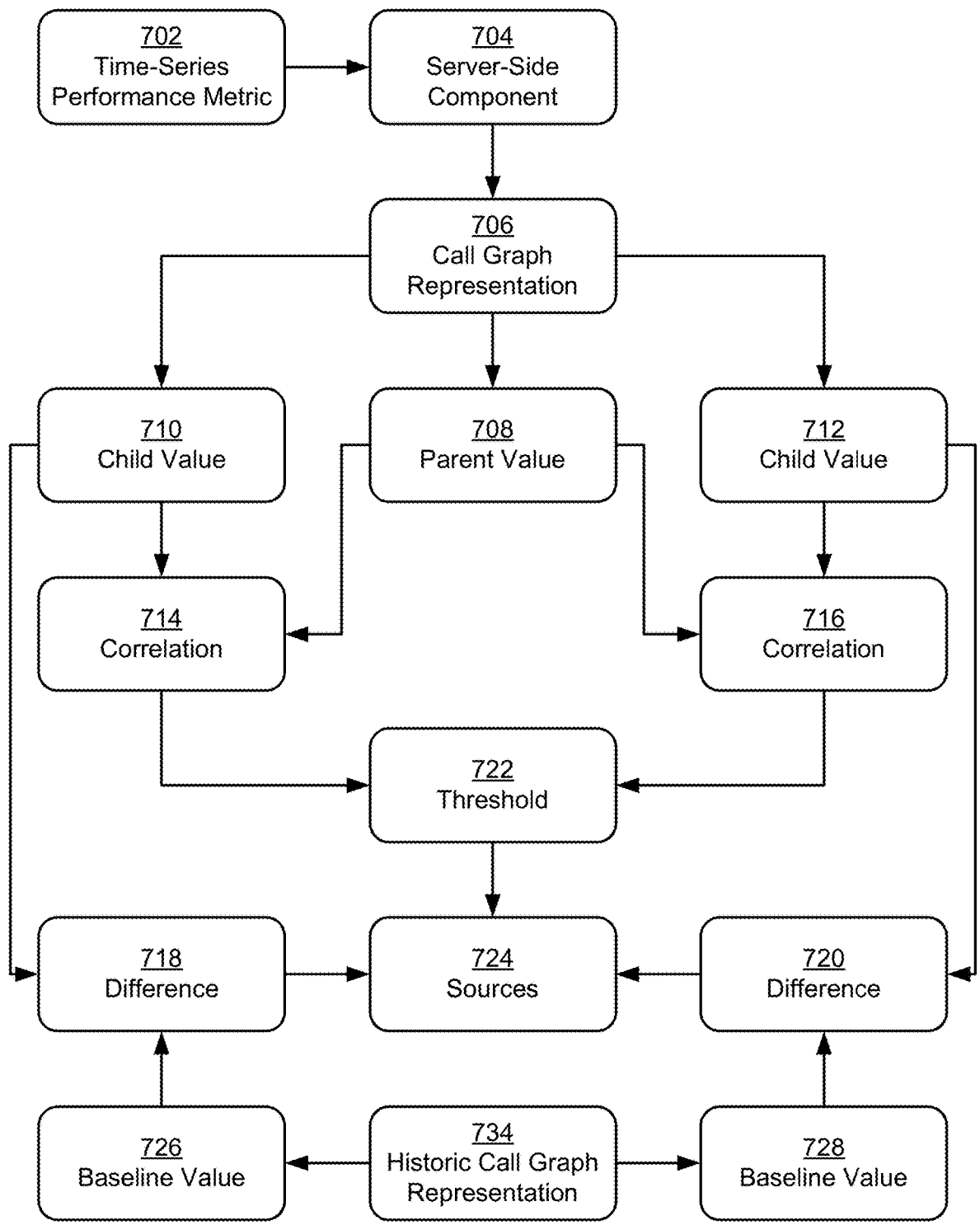
FIG. 7A shows the analysis of a server-side issue associated with an anomaly in a time-series performance metric in accordance with the disclosed embodiments.

FIG. 7A shows the analysis of a server-side issue associated with an anomaly in a time-series performance metric in accordance with the disclosed embodiments. As discussed above, the server-side issue may be identified as a root cause of an anomaly in time-series performance metric 602 when a deviation (e.g., deviation 518 of FIG. 5) in a server-side component 704 of time-series performance metric 602 is found.

During analysis of the server-side issue, a call graph representation 706 of server-side component 704 may be obtained. Call graph representation 706 may map server-side component 704 onto a call graph of calls that are made during measurement of time-series performance metric 702. For example, call graph representation 706 may track the latencies, processing times, and/or other performance metrics of API calls that were made during loading of a page from a website.

As shown in FIG. 7A, call graph representation 706 may include a parent value 708 of server-side component 704 for a parent node in the call graph and multiple child values 710-712 of server-side component 704 for a set of child nodes of the parent node in the call graph. The parent node may represent an API that is initially called during a page load and/or other activity associated with time-series performance metric 702, and the child nodes may represent APIs, methods, functions, and/or other components that are called by the parent node to execute subroutines associated with the activity. As a result, parent value 708 of server-side component 704 may be at least as large as the highest child value of server-side component 704 in call graph representation 706.

While two child values 710-712 are shown in FIG. 7A, those skilled in the art will appreciate that call graph representation 706 may include varying numbers of child values for different sets of child nodes in the call graph. Moreover, the call graph may have a tree structure, in which a given node in the call graph may be a parent of one or more child nodes and/or a child of a parent node. Calls from a given parent node to child nodes of the parent node may additionally be sequential or parallel. Thus, the effect of individual child nodes on the latency and/or processing time of the parent node may be difficult to ascertain using a direct comparison of parent value 708 and child values 710-712.

To identify child nodes that contribute significantly to server-side component 704 and the anomaly, a correlation 714-716 between each child value and parent value 708 may be determined. For example, call graph representation 706 may include time-series data and/or aggregated time-series data that track changes in parent value 708 and child values 710-712 over time. Each correlation 714-716 may be calculated as a coefficient that measures the statistical dependence of parent value 708 on the corresponding child value 710-712 over time.

Next, correlations 714-716 may be compared to a threshold 722, and child nodes in the call graph with correlations 714-716 that exceed threshold 722 may be identified as one or more sources 724 of the anomaly. For example, child nodes with correlations that are above a pre-specified amount (e.g., 0.7) and/or a pre-specified number of child nodes with the highest correlations may be included in sources 724.

Sources 724 may also be updated based on differences 718-720 between child values 710-712 and baseline values 726-728 of server-side component 704 for the same child nodes. For example, an average child value for each child node in the call graph may be obtained by averaging the child values for the child node in a current window within which time-series performance metric 702 is analyzed, such as current window 404 of FIG. 4. An average baseline value for the child node may also be obtained by averaging the child values for the child node from a historic call graph representation 734 of server-side component 704, which may include historic values of server-side component from previous windows and/or seasonal periods associated with time-series performance metric 702. A percent difference between the average baseline value and the average child value may then be calculated, and sources 724 may be ranked, filtered, and/or otherwise modified based on the percent difference. Consequently, sources 724 of the anomaly may be identified as child nodes with child values 710-712 of server-side component 704 that correlate strongly with parent value 708 and deviate from baseline values 726-728 for the child nodes.

Figure 7B:
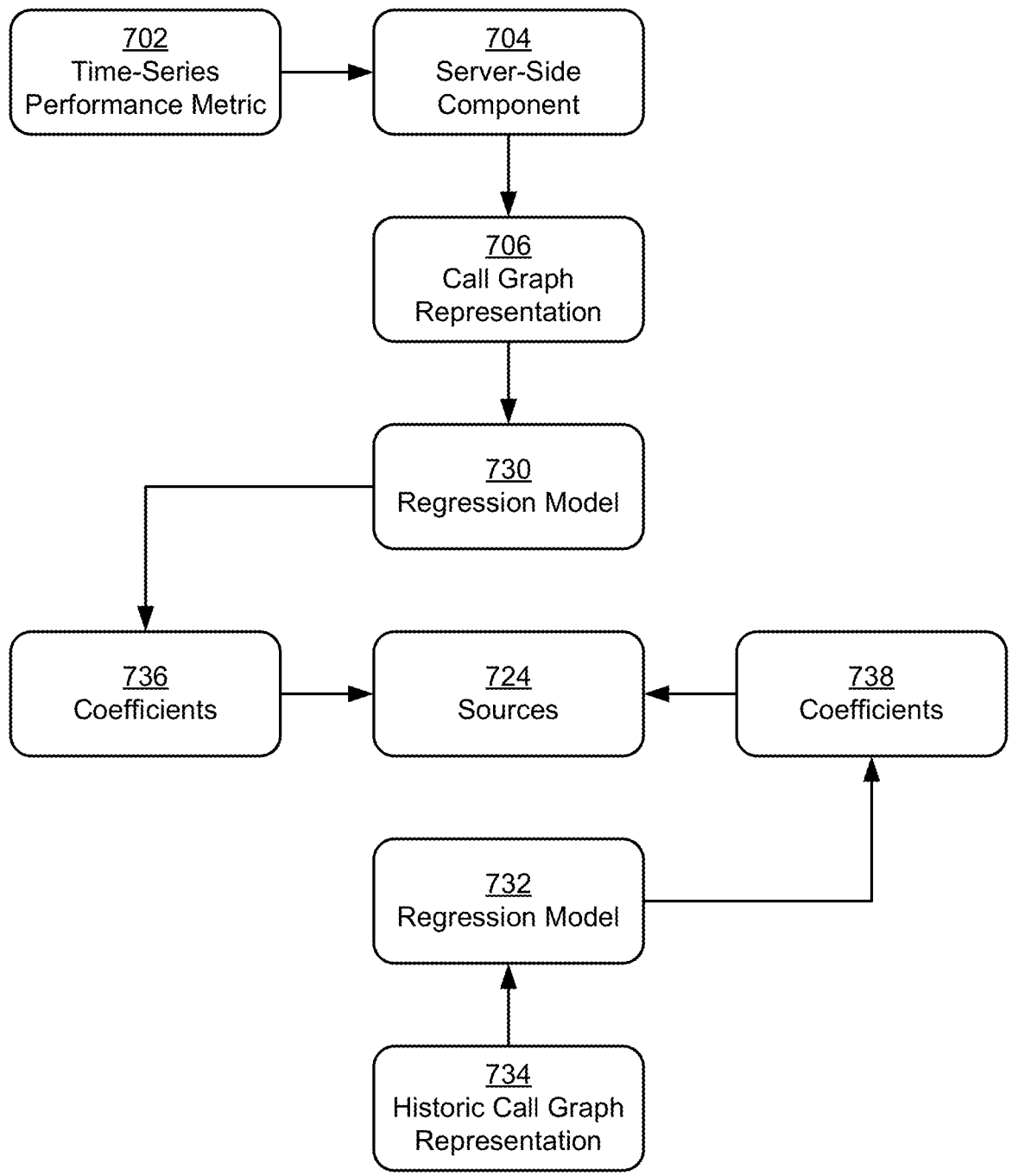
FIG. 7B shows the analysis of a server-side issue associated with an anomaly in a time-series performance metric in accordance with the disclosed embodiments.

FIG. 7B shows the analysis of a server-side issue associated with an anomaly in time-series performance metric 702 in accordance with the disclosed embodiments. Like the analysis of FIG. 7A, the analysis performed in FIG. 7B may use call graph representation 706 and historic call graph representation 734 of server-side component 704 in time-series performance metric 702.

Unlike the analysis of FIG. 7A, the analysis of FIG. 7B may use a number of regression models 730-732 to identify one or more sources 724 of the anomaly. In particular, call graph representation 706 may be used to generate a first regression model 730 that estimates recent parent values of server-side component 704 based on recent child values of server-side component 704. Historic call graph representation 734 may be used to generate a second regression model 732 that estimates a historic and/or baseline parent value of server-side component 702 based on historic and/or baseline child values of server-side component 704. Coefficients 736-738 of regression models 730-732 may then be used to identify one or more of the child nodes as sources 724 of the anomaly.

For example, regression model 730 may be created from call graph representation 706, which includes the latencies of multiple individual page loads over a recent interval (e.g., in the last 15 minutes) instead of aggregated latencies of the page loads over the same interval. Regression model 732 may be created from historic call graph representation 734, which includes latencies of multiple individual page loads that occurred in the same 15-minute interval one week ago to capture the seasonality in time-series performance metric 702. Each regression model may estimate the parent value as a linear combination of the corresponding child values and a set of positive coefficients 736-738 by which the child values are multiplied.

Because a higher coefficient for a child value results in a higher contribution of the child value to the estimated parent value, an increase in a coefficient in regression model 730 and/or child value in call graph representation 706 over the corresponding coefficient in regression model 732 and/or child value in historic call graph representation 734 may indicate that the corresponding child node is a source of the anomaly. As a result, sources 724 may include child nodes with coefficients from regression model 730 that are higher than the corresponding coefficients from regression model 732 and/or recent child values that are higher than the corresponding baseline values by a statistically significant amount.

Those skilled in the art will appreciate that the analyses of FIGS. 7A-7B may be performed separately and/or may be combined to identify sources 724 of anomalies caused by the server-side issues. For example, the analysis of FIG. 7A may be used with aggregated call graph representations of server-side component 704, and the analysis of FIG. 7B may be used with call graph representations of individual events such as page loads. If both aggregated and individual call graph representations are available, sources 724 may include the union and/or intersection of child nodes identified using both analyses.

Figure 8:
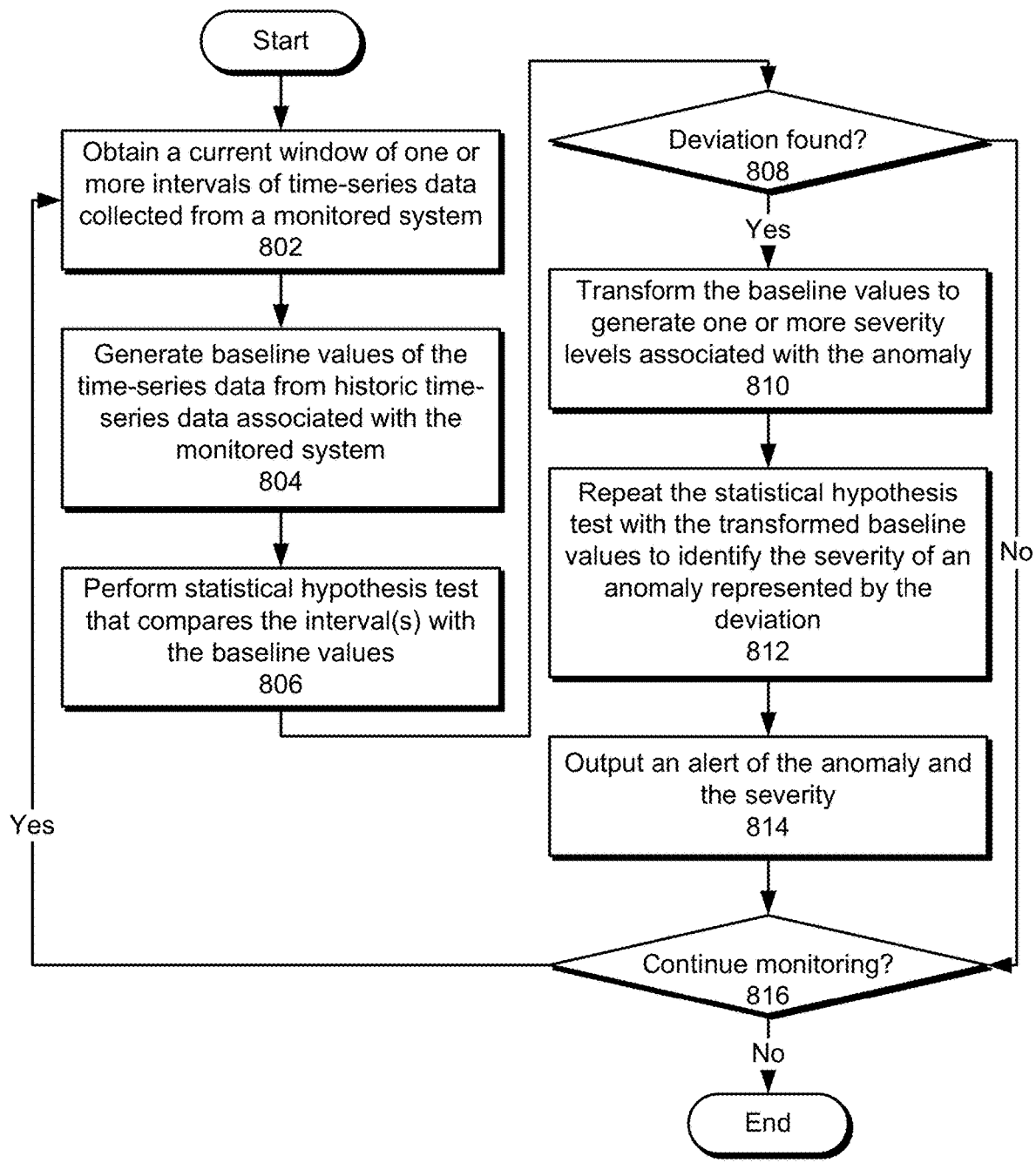
FIG. 8 shows a flowchart illustrating the process of detecting an anomaly in time-series data collected from a monitored system in accordance with the disclosed embodiments.

FIG. 8 shows a flowchart illustrating the process of detecting an anomaly in time-series data collected from a monitored system in accordance with the disclosed embodiments. In one or more embodiments, one or more of the steps may be omitted, repeated, and/or performed in a different order. Accordingly, the specific arrangement of steps shown in FIG. 8 should not be construed as limiting the scope of the technique.

Initially, a current window of one or more intervals of time-series data collected from a monitored system is obtained (operation 802). For example, the current window may include the most recent two hours of time-series data collected from one or more computer systems, servers, data centers, and/or applications. Within the two-hour window, the time-series data may be aggregated into a mean, quantile, variance, count, and/or other summary statistic that spans five-minute intervals.

Next, baseline values of the time-series data are retrieved or generated from historic time-series data associated with the monitored system (operation 804). For example, one or more previous windows of the historic time-series data may be obtained from one or more seasonal periods prior to a current seasonal period that contains the current window. The historic time-series data from the previous window(s) may then be aggregated into one or more additional intervals that correspond to the interval(s) of the time-series data within the current seasonal period and current window.

A statistical hypothesis test that compares the interval(s) with the baseline values is performed (operation 806) to assess a deviation (operation 808) of the time-series data from the baseline values. For example, a sign test may be used to identify a statistically significant deviation of the time-series data from the baseline values. If no deviation is found, no additional analysis of the current window is performed.

If a deviation is found, the baseline values are transformed to generate one or more severity levels associated with the anomaly (operation 810), and the statistical hypothesis test is repeated with the transformed baseline values to identify the severity of an anomaly represented by the deviation (operation 812). For example, the baseline values may be linearly transformed by fixed amounts and/or percentage increments, and the statistical hypothesis test may be repeated with the transformed baseline values to determine if the deviation is still present. The severity may then be obtained as the highest increase in the baseline values for which the deviation can still be detected.

Finally, an alert of the anomaly and the severity is outputted (operation 814). For example, an alert of an anomaly in a site speed performance metric may be transmitted to a page owner of a web page associated with the page loading time and/or an infrastructure owner associated with a location of the anomaly.

Monitoring of the time-series data may continue (operation 816). For example, time-series data associated with the performance of a website may continue to be monitored while the website is publicly accessible. If monitoring is to continue, a new current window of time-series data is obtained (operation 802) and compared with baseline values of the time-series data in the new current window to assess a deviation in the time-series data from the baseline values (operations 804-808). If a deviation is found, the severity of the anomaly is identified and outputted with the anomaly in an alert (operations 810-814). Monitoring of the time-series data may thus continue until the time-series data is no longer collected from the monitored system.

Figure 9:
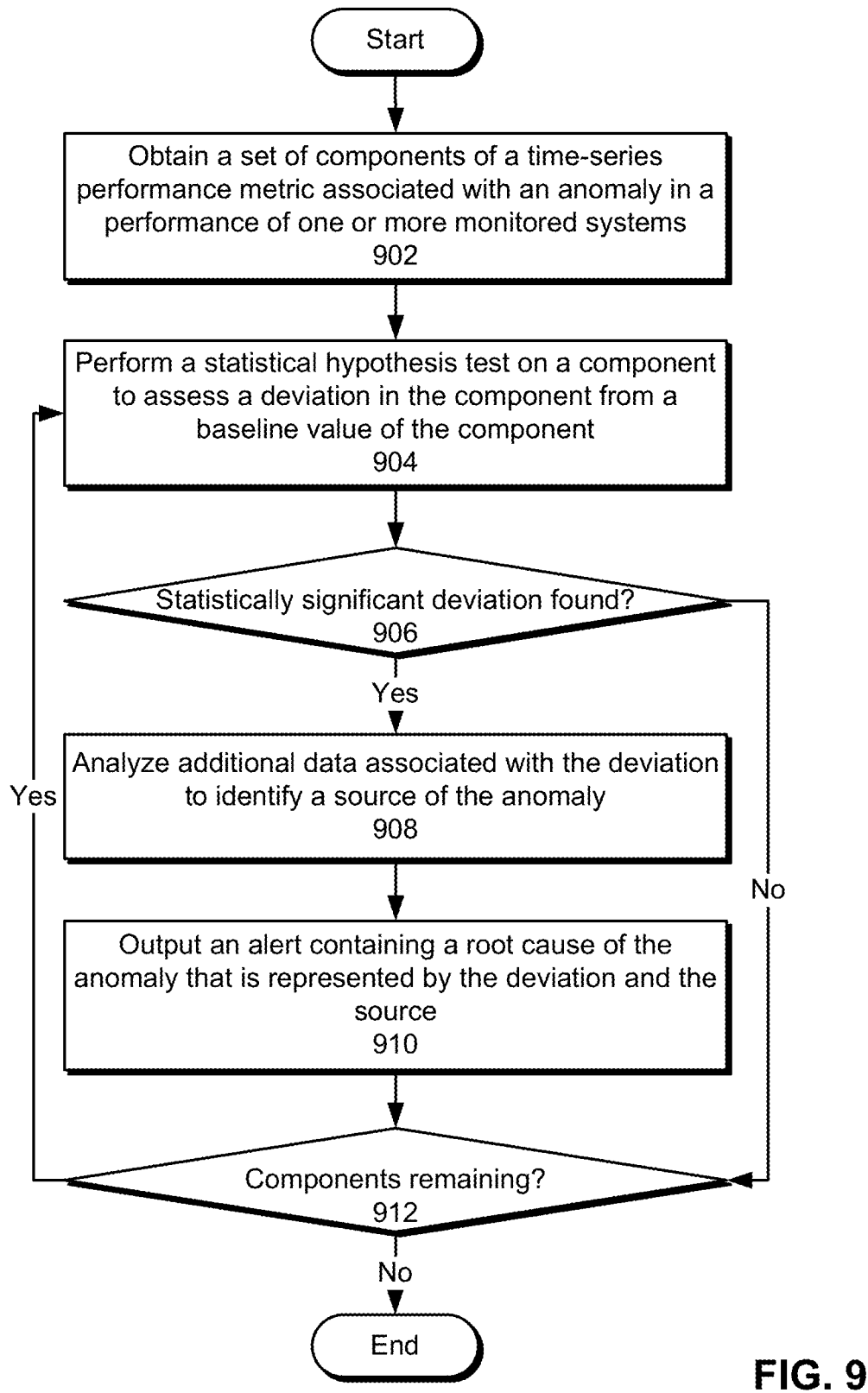
FIG. 9 shows a flowchart illustrating the process of analyzing a root cause of an anomaly in time-series performance data in accordance with the disclosed embodiments.

FIG. 9 shows a flowchart illustrating the process of analyzing a root cause of an anomaly in time-series performance data in accordance with the disclosed embodiments. In one or more embodiments, one or more of the steps may be omitted, repeated, and/or performed in a different order. Accordingly, the specific arrangement of steps shown in FIG. 9 should not be construed as limiting the scope of the technique.

First, a set of components of a time-series performance metric associated with an anomaly in a monitored system is obtained (operation 902). For example, a breakdown of a page load time into a connection time, first byte time, content download time, and/or client rendering time component may be obtained after an anomaly in the page load time is detected.

Next, a statistical hypothesis test is performed on a component to assess a deviation in the component from a baseline value of the component (operation 904). As with baseline values of the time-series performance data, the baseline value of the component may be generated from one or more seasonal periods associated with the time-series performance metric. The baseline value may include one or more intervals of the component in one or more previous windows that match one or more intervals of the current window from which values of the component are obtained.

The root cause analysis may proceed based on a presence or absence of a statistically significant deviation (operation 906) in the component. If no statistically significant deviation is found by the statistical hypothesis test, no additional processing of the component is performed.

If a statistically significant deviation is found, additional data associated with the deviation is analyzed to identify a source of the anomaly (operation 908), and an alert containing a root cause of the anomaly that is represented by the deviation and the source is outputted (operation 910). Illustratively, a deviation in the connection time of a page load may indicate a network issue as a root cause of the anomaly, a deviation in the first byte time and/or content download time of the page load may indicate a server-side issue as a root cause of the anomaly, and a deviation in the client rendering time of the page load may indicate a client issue as a root cause of the anomaly. Analyzing additional data associated with the deviation to identify a source of an anomaly caused by a network issue is described in further detail below with respect to FIG. 10, and analyzing additional data associated with the deviation to identify a source of an anomaly caused by a server-side issue is described in further detail below with respect to FIGS. 11-13.

Root cause analysis may be repeated for remaining components (operation 912) in the time-series performance metric. For each component of the time-series performance metric, the statistical hypothesis test is performed to identify the presence or absence of a statistically significant deviation in the component from a baseline value (operations 904-906). If the statistically significant deviation is found, additional data associated with the deviation is analyzed to identify a source of the anomaly (operation 908), and an alert containing the root cause and source of the anomaly is outputted (operation 910). Such analysis and/or alerting may continue until all components of the time-series performance metric have been analyzed for deviations.

Figure 10:
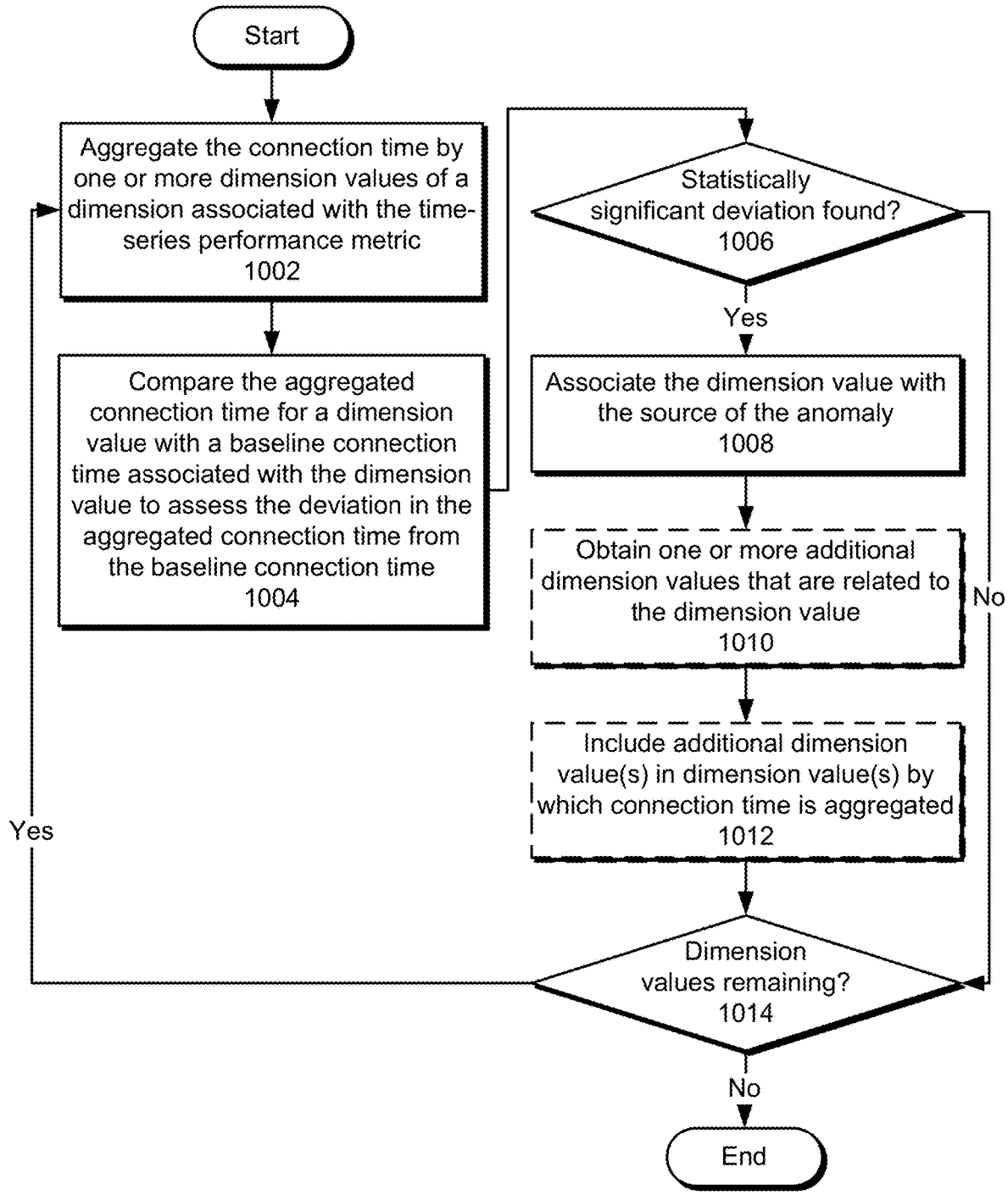
FIG. 10 shows a flowchart illustrating the process of analyzing an anomaly in a time-series performance metric that is caused by a network issue in accordance with the disclosed embodiments.

FIG. 10 shows a flowchart illustrating the process of analyzing an anomaly in a time-series performance metric that is caused by a network issue in accordance with the disclosed embodiments. In one or more embodiments, one or more of the steps may be omitted, repeated, and/or performed in a different order. Accordingly, the specific arrangement of steps shown in FIG. 10 should not be construed as limiting the scope of the technique.

First, a connection time in the time-series performance metric is aggregated by one or more dimension values of a dimension associated with the time-series performance metric (operation 1002). For example, the connection time may be aggregated (e.g., averaged) along dimension values for a data center, PoP, ASN, page, and/or country associated with a page load time.

Next, the aggregated connection time for a dimension value is compared with a baseline connection time associated with the dimension value to assess the deviation in the aggregated connection time from the baseline connection time (operation 1004). For example, a statistical hypothesis test may be used to compare the aggregated connection time with the baseline connection time. Processing of the aggregated connection time may continue based on the presence or absence of a statistically significant deviation (operation 1006) in the aggregated connection time. If no deviation is found, no further processing associated with the aggregated connection time for the dimension value is performed.

If a statistically significant deviation is found, the dimension value is associated with the source of the anomaly (operation 1008). For example, the dimension value may be included in an alert that identifies the network issue as a root cause of the anomaly. One or more additional dimension values that are related to the dimension value may optionally be obtained (operation 1010) and included in the dimension values by which the connection time is aggregated (operation 1012). For example, a deviation in the aggregated connection time for a country may result in the inclusion of all data center names in the country as dimension values by which the connection time is to be aggregated.

Analysis of aggregated connection times may continue for remaining dimension values (operation 1014) used to aggregate the connection times. In particular, the connection time is aggregated by each dimension value (operation 1002), and the aggregated connection time for the dimension value is compared with a baseline connection time for the dimension value to assess a deviation in the aggregated connection time from the baseline connection time (operations 1004-1006). If a statistically significant deviation is found, the dimension value is associated with the source of the anomaly (operation 1008), and any related dimension values may be obtained and added to the dimension values used to aggregate the connection time (operations 1010-1012). Analysis of aggregated connection times may thus continue until aggregations of the connection times along all relevant dimensions and/or dimension values have been generated and analyzed for deviations from the corresponding baseline connection times.

Figure 11:
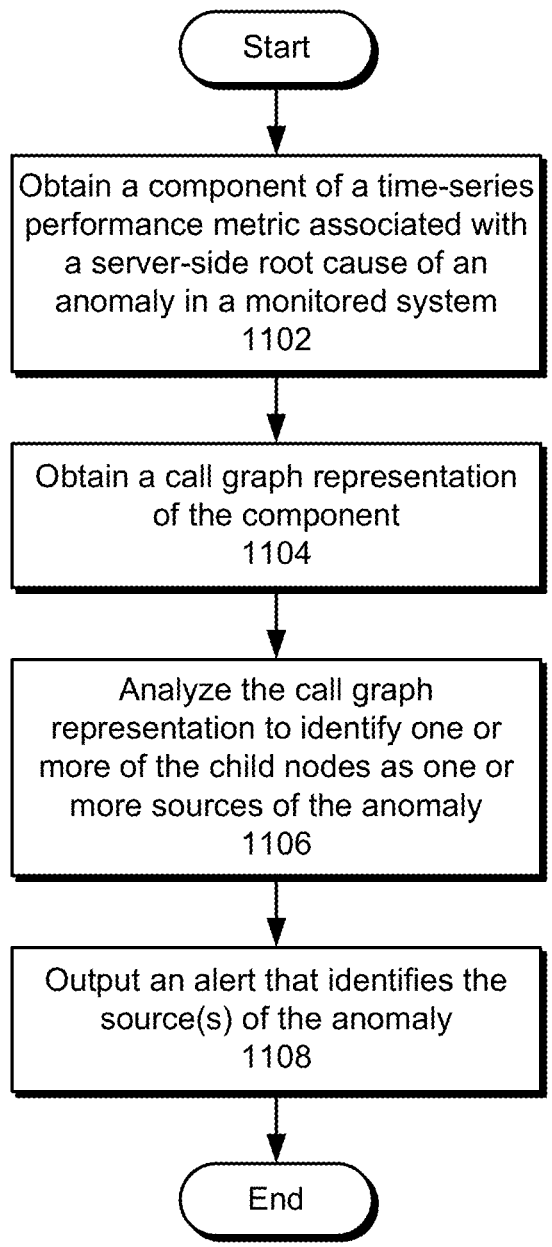
FIG. 11 shows a flowchart illustrating the process of analyzing a server-side root cause of an anomaly in a time-series performance metric in accordance with the disclosed embodiments.

FIG. 11 shows a flowchart illustrating the process of analyzing a server-side root cause of an anomaly in a time-series performance metric in accordance with the disclosed embodiments. In one or more embodiments, one or more of the steps may be omitted, repeated, and/or performed in a different order. Accordingly, the specific arrangement of steps shown in FIG. 11 should not be construed as limiting the scope of the technique.

Initially, a component of a time-series performance metric associated with a server-side root cause of an anomaly in a monitored system is obtained (operation 1102). For example, the component may be a first byte time and/or a content download time of a page load. The server-side root cause of the anomaly may be identified by performing a statistical hypothesis test on the component and using the statistical hypothesis test to detect a statistically significant deviation in the component from a baseline value of the component, as described above.

Next, a call graph representation of the component is obtained (operation 1104). The call graph representation may include a parent value of the component for a parent node and a set of child values of the component for a set of child nodes of the parent node. For example, the parent value may represent a top-level API call used to perform the page load, and the child nodes may represent lower-level API calls that are called by the parent node and/or other child nodes to perform subroutines associated with the page load. As a result, the parent value may be at least as large as the maximum child value in the call graph representation.

The call graph representation is then analyzed to identify one or more of the child nodes as one or more sources of the anomaly (operation 1106). For example, the call graph representation may be analyzed for correlations between the child values and the parent value, as described in further detail below with respect to FIG. 12. In another example, regression models may be used to analyze the statistical dependence of the parent value on the child values, as described in further detail below with respect to FIG. 13.

Finally, an alert that identifies the source(s) of the anomaly is outputted (operation 1108). For example, the alert may identify API calls that are highly correlated with latency in the first byte time and/or content download time of a page load. In turn, the identified API calls may allow developers and/or other users associated with the respective APIs to resolve issues that may contribute to the latency.

Figure 12:
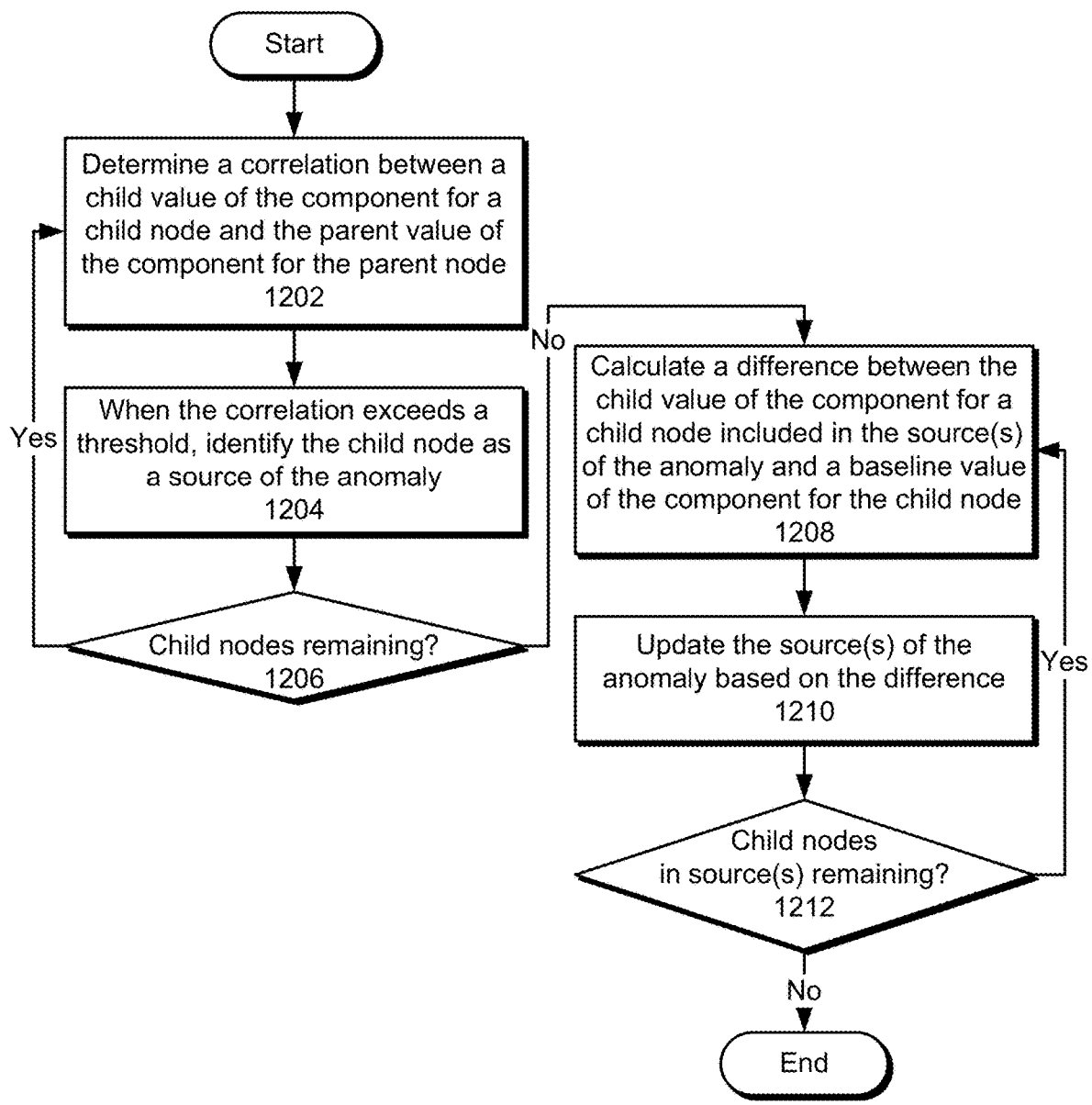
FIG. 12 shows a flowchart illustrating the process of using a call graph representation of a component of a time-series performance metric to analyze a server-side root cause of an anomaly in the time-series performance metric in accordance with the disclosed embodiments.

FIG. 12 shows a flowchart illustrating the process of using a call graph representation of a component of a time-series performance metric to analyze a server-side root cause of an anomaly in the time-series performance metric in accordance with the disclosed embodiments. In one or more embodiments, one or more of the steps may be omitted, repeated, and/or performed in a different order. Accordingly, the specific arrangement of steps shown in FIG. 12 should not be construed as limiting the scope of the technique.

First, a correlation between a child value of the component for a child node in the call graph representation and the parent value of the component for the parent node in the call graph representation is determined (operation 1202). For example, the correlation may be calculated as the amount by which changes in the child value track changes in the parent value over time. When the correlation exceeds a threshold, the child node is identified as a source of the anomaly (operation 1204). Operations 1202-1204 may then be repeated for all remaining child nodes (operation 1206) in the call graph representation.

Next, a difference between the child value of the component for a child node included in the source(s) of the anomaly and a baseline value of the component for the child node is calculated (operation 1208). For example, the difference may be calculated as a percent difference between an average child value of the component for the child node over a pre-specified window and an average baseline value of the component for the child node over a corresponding pre-specified window in the past.

The source(s) of the anomaly may then be updated based on the difference (operation 1210). For example, a difference between the child value and the baseline value that falls below a threshold may cause the child node to be removed from a list of sources of the anomaly and/or ranked lower than other child nodes with higher differences. The correlation and/or difference may also be included in an alert of the anomaly to facilitate prioritization of tasks used to resolve the anomaly. Operations 1208-1210 may then be repeated for all remaining child nodes in the source(s) (operation 1212) of the anomaly.

Figure 13:
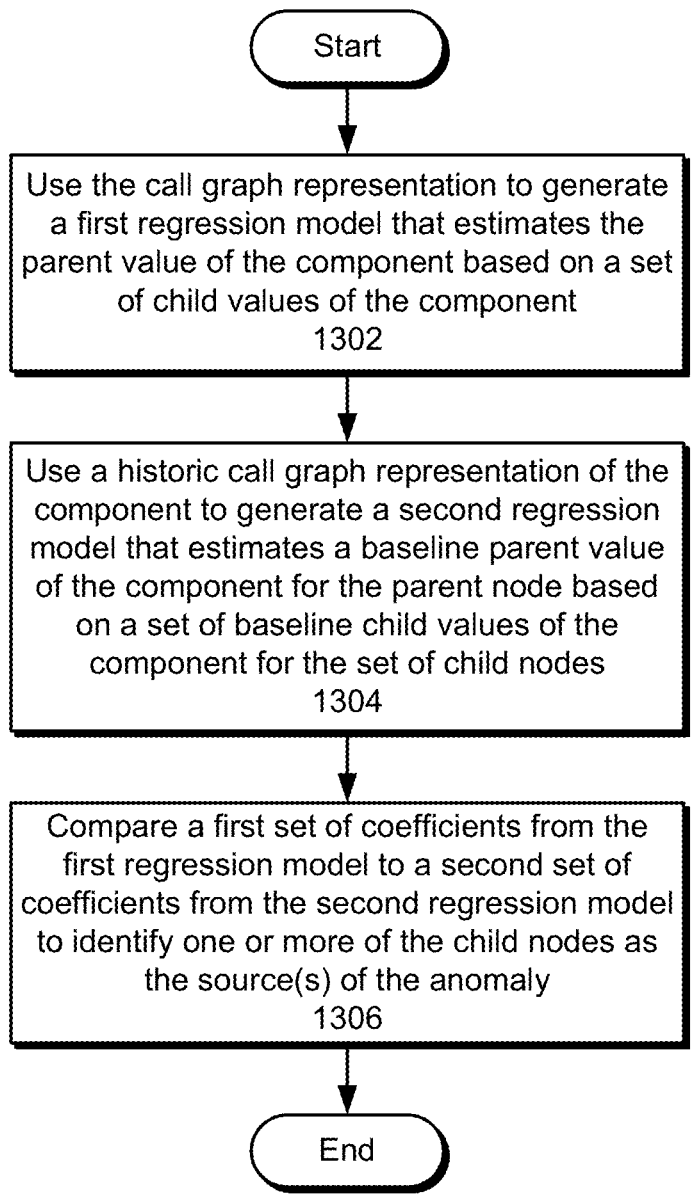
FIG. 13 shows a flowchart illustrating the process of using a call graph representation of a component of a time-series performance metric to analyze a server-side root cause of an anomaly in the time-series performance metric in accordance with the disclosed embodiments.

FIG. 13 shows a flowchart illustrating the process of using a call graph representation of a component of a time-series performance metric to analyze a server-side root cause of an anomaly in the time-series performance metric in accordance with the disclosed embodiments. In one or more embodiments, one or more of the steps may be omitted, repeated, and/or performed in a different order. Accordingly, the specific arrangement of steps shown in FIG. 13 should not be construed as limiting the scope of the technique.

First, the call graph representation is used to generate a first regression model that estimates the parent value of the component based on a set of child values of the component (operation 1302). For example, the parent value and child values from a current window of recent page loads may be used to fit the first regression model to the recent page loads.

Next, a historic call graph representation of the component is used to generate a second regression model that estimates a baseline parent value of the component for the parent node based on a set of baseline child values of the component for the set of child nodes (operation 1304). Continuing with the above example, the parent and child values from a previous window of page loads in a previous seasonal period that matches the current window in the current season period may used to fit the second regression model to the previous page loads.

A first set of coefficients from the first regression model is then compared to a second set of coefficients from the second regression model to identify one or more of the child nodes as the source(s) of the anomaly (operation 1306). For example, a child node may be identified as a source of the anomaly when the coefficient for the child node in the first regression model is higher than the corresponding coefficient for the child node in the second regression model and the child value of the component for the child node deviates from a baseline value of the component for the child node.

Figure 14:
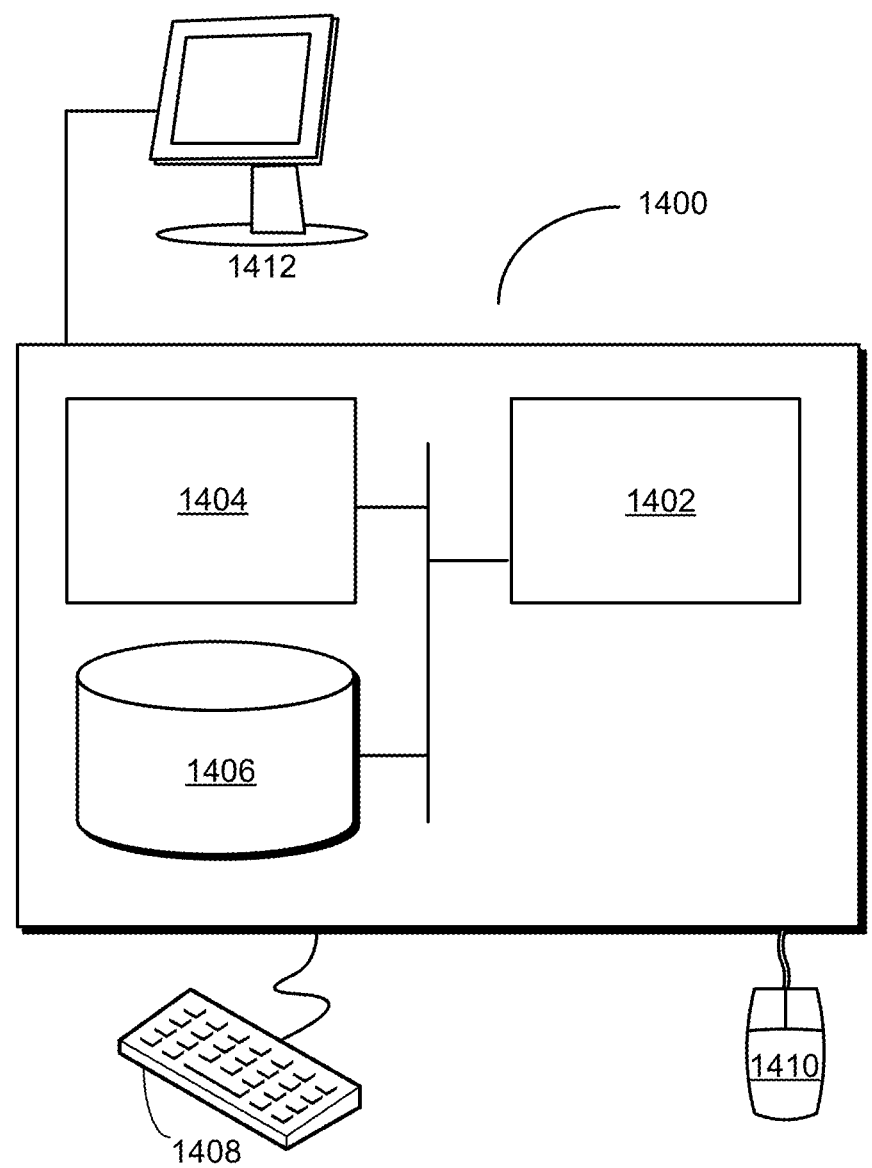
FIG. 14 shows a computer system in accordance with the disclosed embodiments.

FIG. 14 shows a computer system 1400. Computer system 1400 includes a processor 1402, memory 1404, storage 1406, and/or other components found in electronic computing devices. Processor 1402 may support parallel processing and/or multi-threaded operation with other processors in computer system 1400. Computer system 1400 may also include input/output (I/O) devices such as a keyboard 1408, a mouse 1410, and a display 1412.

Computer system 1400 may include functionality to execute various components of the present embodiments. In particular, computer system 1400 may include an operating system (not shown) that coordinates the use of hardware and software resources on computer system 1400, as well as one or more applications that perform specialized tasks for the user. To perform tasks for the user, applications may obtain the use of hardware resources on computer system 1400 from the operating system, as well as interact with the user through a hardware and/or software framework provided by the operating system.

In one or more embodiments, computer system 1400 provides a system for analyzing time-series data. The system may include an analysis apparatus and a management apparatus. The analysis apparatus may obtain a current window of one or more intervals of time-series data collected from a monitored system. Next, the analysis apparatus may continuously perform a statistical hypothesis test that compares the one or more intervals of the time-series data with baseline values from historic time-series data associated with the monitored system. When the statistical hypothesis test indicates a deviation of the time-series data from the baseline values, the management apparatus may output an alert of an anomaly represented by the deviation.

The analysis apparatus may also obtain a set of components of a time-series performance metric associated with an anomaly in a performance of one or more monitored systems. For each component in the set of components, the analysis apparatus may perform a statistical hypothesis test on the component to assess a deviation of the component from a baseline value of the component. When the statistical hypothesis test identifies the deviation of the component from the baseline value, the management apparatus may output an alert containing a root cause of the anomaly that is represented by the deviation in the component from the baseline value.

Finally, if a server-side issue is found as a root cause of the anomaly, the analysis apparatus may obtain a component of a time-series performance metric associated with the server-side root cause of the anomaly. Next, the analysis apparatus may obtain a call graph representation of the component, which includes a parent node having a parent value of the component and a set of child nodes of the parent node, each child node having a corresponding child value of the component. The analysis apparatus may then analyze the call graph representation to identify one or more of the child nodes as sources of the anomaly, and the management apparatus may output an alert that identifies the source(s) of the anomaly.

In addition, one or more components of computer system 1400 may be remotely located and connected to the other components over a network. Portions of the present embodiments (e.g., analysis apparatus, management apparatus, data repository, monitored systems, etc.) may also be located on different nodes of a distributed system that implements the embodiments. For example, the present embodiments may be implemented using a cloud computing system that monitors a set of remote systems for anomalies, analyzes root causes of the anomalies, and/or identifies sources of the anomalies.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
obtaining a current window of one or more intervals of time-series data collected from a monitored system;
repeatedly performing, by a computer system, a statistical hypothesis test that compares the one or more intervals of the time-series data with baseline values from historic time-series data associated with the monitored system; and
when the statistical hypothesis test indicates a deviation of the time-series data from the baseline values:
transforming the baseline values to generate one or more severity levels associated with an anomaly represented by the deviation;
repeating the statistical hypothesis test with the transformed baseline values to identify a severity of the anomaly; and
outputting an alert of the anomaly.

2. The method of claim 1, further comprising:
generating the baseline values from the historic time-series data based on a seasonality of the time-series data.

3. The method of claim 2, wherein generating the baseline values from the historic time-series data based on the seasonality of the time-series data comprises:
obtaining one or more previous windows of the historic time-series data from one or more seasonal periods prior to a current seasonal period that contains the current window; and
aggregating the historic time-series data from the one or more previous windows into one or more additional intervals that correspond to the one or more intervals of the time-series data within the current seasonal period and the current window.

4. The method of claim 1, further comprising:
including the severity of the anomaly in the outputted alert.

5. The method of claim 1, wherein obtaining the one or more intervals of the time-series data collected during the execution of the monitored system comprises:
aggregating the time-series data within the one or more intervals.

6. The method of claim 5, wherein the aggregated time-series data comprises at least one of:
a median;
a mean;
a quantile;
a variance; and
a count.

7. The method of claim 1, wherein the statistical hypothesis test comprises a sign test.

8. The method of claim 1, wherein the time-series data comprises a page loading time.

9. The method of claim 8, wherein outputting the alert of the anomaly represented by the deviation comprises at least one of:
transmitting the alert to a page owner of a web page associated with the page loading time; and
transmitting the alert to an infrastructure owner associated with a location of the anomaly.

10. The method of claim 1, wherein outputting the alert of the anomaly represented by the deviation comprises:
matching one or more attributes of the anomaly to the alert; and
grouping one or more additional anomalies into the alert with the anomaly.

11. An apparatus, comprising:
one or more processors; and
memory storing instructions that, when executed by the one or more processors, cause the apparatus to:
obtain a current window of one or more intervals of time-series data collected from a monitored system;
perform a statistical hypothesis test that compares the one or more intervals of the time-series data with baseline values from historic time-series data associated with the monitored system; and
when the statistical hypothesis test indicates a deviation of the time-series data from the baseline values:
transform the baseline values to generate one or more severity levels associated with an anomaly represented by the deviation;
repeat the statistical hypothesis test with the transformed baseline values to identify a severity of the anomaly; and
output an alert of the anomaly.

12. The apparatus of claim 11, wherein the memory further stores instructions that, when executed by the one or more processors, cause the apparatus to:
generate the baseline values from the historic time-series data based on a seasonality of the time-series data.

13. The apparatus of claim 12, wherein generating the baseline values from the historic time-series data based on the seasonality of the time-series data comprises:
obtaining one or more previous windows of the historic time-series data from one or more seasonal periods prior to a current seasonal period that contains the current window; and
aggregating the historic time-series data from the one or more previous windows into one or more additional intervals that correspond to the one or more intervals of the time-series data within the current seasonal period and the current window.

14. The apparatus of claim 11, wherein the memory further stores instructions that, when executed by the one or more processors, cause the apparatus to:
include the severity of the anomaly in the outputted alert.

15. The apparatus of claim 11, wherein obtaining the one or more intervals of the time-series data collected during the execution of the monitored system comprises:
aggregating the time-series data within the one or more intervals.

16. The apparatus of claim 15, wherein the aggregated time-series data comprises at least one of:
a median;
a mean;
a quantile;
a variance; and
a count.

17. The apparatus of claim 11, wherein the statistical hypothesis test comprises a sign test.

18. A system, comprising:
an analysis module comprising a non-transitory computer-readable medium comprising instructions that, when executed by one or more processors, cause the system to:
obtain a current window of one or more intervals of time-series data collected from a monitored system; and
perform a statistical hypothesis test that compares the one or more intervals of the time-series data with baseline values from historic time-series data associated with the monitored system; and
a management module comprising a non-transitory computer-readable medium comprising instructions that, when executed by the one or more processors, cause the system to, when the statistical hypothesis test indicates a deviation of the time-series data from the baseline values:
transform the baseline values to generate one or more severity levels associated with an anomaly represented by the deviation;
repeat the statistical hypothesis test with the transformed baseline values to identify a severity of the anomaly; and
output an alert of the anomaly.

19. The system of claim 18, wherein the non-transitory computer-readable medium of the analysis module further comprises instructions that, when executed by the one or more processors, cause the system to:
generate the baseline values from the historic time-series data based on a seasonality of the time-series data.

20. The system of claim 18, wherein the non-transitory computer-readable medium of the analysis module further comprises instructions that, when executed by the one or more processors, cause the system to:
include the severity of the anomaly in the outputted alert.

* * * * *